United States Patent
Kagawa et al.

(10) Patent No.: US 7,298,893 B2
(45) Date of Patent: Nov. 20, 2007

(54) IMAGE PROCESSING DEVICE AND IMAGE PROCESSING METHOD

(75) Inventors: Shuichi Kagawa, Tokyo (JP); Hiroaki Sugiura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 994 days.

(21) Appl. No.: 10/437,986

(22) Filed: May 15, 2003

(65) Prior Publication Data

US 2003/0223636 A1   Dec. 4, 2003

(30) Foreign Application Priority Data

Jun. 4, 2002   (JP)   ............... 2002-162448

(51) Int. Cl.
*G06K 9/00*   (2006.01)
(52) U.S. Cl. .................. 382/167; 358/3.13
(58) Field of Classification Search ........... 382/162, 382/167; 358/3.13, 518, 519
See application file for complete search history.

(56) References Cited

U.S. PATENT DOCUMENTS

| | | | |
|---|---|---|---|
| 4,631,578 A | | 12/1986 | Sasaki et al. |
| 5,473,446 A | * | 12/1995 | Perumal et al. ............ 358/523 |
| 5,552,905 A | | 9/1996 | Tanaka |
| 5,588,050 A | | 12/1996 | Kagawa et al. |
| 5,764,862 A | * | 6/1998 | Metcalfe et al. ............ 358/1.2 |
| 5,774,577 A | | 6/1998 | Ueda et al. |
| 5,809,366 A | * | 9/1998 | Yamakawa et al. .......... 399/39 |
| 6,125,202 A | | 9/2000 | Kagawa et al. |
| 6,434,268 B1 | | 8/2002 | Asamura et al. |
| 6,633,412 B1 | * | 10/2003 | Lin et al. ............ 358/3.13 |
| 6,714,320 B1 | * | 3/2004 | Nakahara et al. .......... 358/3.13 |

FOREIGN PATENT DOCUMENTS

| | | |
|---|---|---|
| EP | 0 543 511 A1 | 5/1993 |
| EP | 0 994 457 A2 | 4/2000 |
| EP | 1 136 974 A1 | 9/2001 |
| JP | 63-013472 A | 1/1988 |
| JP | 63-39188 B2 | 8/1988 |
| JP | 07-093536 A | 4/1995 |
| JP | 2001-111857 A | 4/2001 |
| JP | 2001-331144 A | 11/2001 |

* cited by examiner

Primary Examiner—Phuoc Tran
(74) Attorney, Agent, or Firm—Birch, Stewart, Kolasch & Birch, LLP

(57) ABSTRACT

In an image processing device and image processing method in which first image data consisting of a plurality of color data and constituting image information for each pixel are input, and second image data consisting of a plurality of color data are calculated and output, after color conversion of the first image data, dither processing is applied to produce the second image data. As a result, information of the fractional part generated as a result of the color conversion is not omitted but preserved. Tone conversion may be performed after the color conversion, and before the dither processing. The image processing device or image processing method can restrain reduction in the number of colors that can be expressed, and restrain the generation of discontinuities (irregularities) in the change of data, while realizing an "exact color reproduction" or "preferred color reproduction."

18 Claims, 18 Drawing Sheets

FIG. 3

|  |  | VALUE OF X | |
|---|---|---|---|
|  |  | EVEN NUMBER | ODD NUMBER |
| VALUE OF Y | EVEN NUMBER | 0 | 3 |
| | ODD NUMBER | 2 | 1 |

FIG. 4A

| 64 | 64 | 65 | 65 | 66 | 66 | 67 | 67 | 68 | 68 |
|---|---|---|---|---|---|---|---|---|---|
| 64 | 64 | 65 | 65 | 66 | 66 | 67 | 67 | 68 | 68 |

PIXEL

FIG. 4B

| 16 | 16 | 16 | 16 | 16 | 16 | 16 | 16 | 17 | 17 |
|---|---|---|---|---|---|---|---|---|---|
| 16 | 16 | 16 | 16 | 16 | 16 | 16 | 16 | 17 | 17 |

FIG. 5A

| 64 | 64 | 65 | 65 | 66 | 66 | 67 | 67 | 68 | 68 |
|---|---|---|---|---|---|---|---|---|---|
| 64 | 64 | 65 | 65 | 66 | 66 | 67 | 67 | 68 | 68 |

PIXEL

FIG. 5B

| 0 | 3 | 0 | 3 | 0 | 3 | 0 | 3 | 0 | 3 |
|---|---|---|---|---|---|---|---|---|---|
| 2 | 1 | 2 | 1 | 2 | 1 | 2 | 1 | 2 | 1 |

FIG. 5C

| 64 | 67 | 65 | 68 | 66 | 69 | 67 | 70 | 68 | 71 |
|---|---|---|---|---|---|---|---|---|---|
| 66 | 65 | 67 | 66 | 68 | 67 | 69 | 68 | 70 | 69 |

FIG. 5D

| 16 | 16 | 16 | 17 | 16 | 17 | 16 | 17 | 17 | 17 |
|---|---|---|---|---|---|---|---|---|---|
| 16 | 16 | 16 | 16 | 17 | 16 | 17 | 17 | 17 | 17 |

AVERAGE:16   AVERAGE:16.5   AVERAGE:17
AVERAGE:16.25   AVERAGE:16.75

| DATA NUMBER | R1 | G1 | B1 | Ra | Ga | Ba | R3 | G3 | B3 | R2 | G2 | B2 |
|---|---|---|---|---|---|---|---|---|---|---|---|---|
| 1 | 40 | 32 | 40 | 40 | 32 | 33.6 | 160 | 128 | 134 | 40 | 32 | 33.5 |
| 2 | 40 | 32 | 39 | 40 | 32 | 32.8 | 160 | 128 | 131 | 40 | 32 | 32.75 |
| 3 | 40 | 32 | 38 | 40 | 32 | 32 | 160 | 128 | 128 | 40 | 32 | 32 |
| 4 | 40 | 32 | 37 | 40 | 32 | 31.2 | 160 | 128 | 124 | 40 | 32 | 31 |
| 5 | 40 | 32 | 36 | 40 | 32 | 30.4 | 160 | 128 | 121 | 40 | 32 | 30.25 |
| 6 | 40 | 32 | 35 | 40 | 32 | 29.6 | 160 | 128 | 118 | 40 | 32 | 29.5 |
| 7 | 40 | 32 | 34 | 40 | 32 | 28.8 | 160 | 128 | 115 | 40 | 32 | 28.75 |
| 8 | 40 | 32 | 33 | 40 | 32 | 28 | 160 | 128 | 112 | 40 | 32 | 28 |
| 9 | 40 | 32 | 32 | 40 | 32 | 27.2 | 160 | 128 | 108 | 40 | 32 | 27 |

FIG. 10A

|  |  | VALUE OF X | |
|---|---|---|---|
|  |  | EVEN NUMBER | ODD NUMBER |
| VALUE OF Y | EVEN NUMBER | 0 | 3 |
| | ODD NUMBER | 2 | 1 |

FIG. 10B

|  |  | VALUE OF X | |
|---|---|---|---|
|  |  | EVEN NUMBER | ODD NUMBER |
| VALUE OF Y | EVEN NUMBER | 1 | 0 |
| | ODD NUMBER | 3 | 2 |

FIG. 10C

|  |  | VALUE OF X | |
|---|---|---|---|
|  |  | EVEN NUMBER | ODD NUMBER |
| VALUE OF Y | EVEN NUMBER | 2 | 1 |
| | ODD NUMBER | 0 | 3 |

FIG. 10D

|  |  | VALUE OF X | |
|---|---|---|---|
|  |  | EVEN NUMBER | ODD NUMBER |
| VALUE OF Y | EVEN NUMBER | 3 | 2 |
| | ODD NUMBER | 1 | 0 |

FIG. 19

| IDENTIFICATION CODE S1 | MAXIMUM VALUE $\beta$ | MINIMUM VALUE $\alpha$ | HUE DATA THAT ARE ZERO* |
|---|---|---|---|
| 0 | R1 | G1 | g, c |
| 1 | R1 | B1 | b, c |
| 2 | G1 | R1 | r, m |
| 3 | G1 | B1 | b, m |
| 4 | B1 | R1 | r, y |
| 5 | B1 | G1 | g, y |

*FROM $r=R1-\alpha, g=G1-\alpha, b=B1-\alpha,$
$y=\beta-B1, m=\beta-G1, c=\beta-R1$

FIG. 20

| IDENTIFICATION CODE S1 | Q1 | Q2 | P1 | P2 |
|---|---|---|---|---|
| 0 | r | b | m | y |
| 1 | r | g | y | m |
| 2 | g | b | c | y |
| 3 | g | r | y | c |
| 4 | b | g | c | m |
| 5 | b | r | m | c |

| HUE | EFFECTIVE FIRST-ORDER TERM |
|---|---|
| RED | h1r |
| GREEN | h1g |
| BLUE | h1b |
| CYAN | h1c |
| MAGENTA | h1m |
| YELLOW | h1y |

| INTER-HUE AREA | EFFECTIVE SECOND-ORDER TERM |
|---|---|
| RED-YELLOW | h2ry |
| YELLOW-GREEN | h2gy |
| GREEN-CYAN | h2gc |
| CYAN-BLUE | h2bc |
| BLUE-MAGENTA | h2bm |
| MAGENTA-RED | h2rm |

| DATA No. | R1 | G1 | B1 | Ra | Ga | Ba | R3 | G3 | B3 |
|---|---|---|---|---|---|---|---|---|---|
| 1 | 40 | 32 | 40 | 40 | 32 | 33.6 | 40 | 32 | 33 |
| 2 | 40 | 32 | 39 | 40 | 32 | 32.8 | 40 | 32 | 32 |
| 3 | 40 | 32 | 38 | 40 | 32 | 32 | 40 | 32 | 32 |
| 4 | 40 | 32 | 37 | 40 | 32 | 31.2 | 40 | 32 | 31 |
| 5 | 40 | 32 | 36 | 40 | 32 | 30.4 | 40 | 32 | 30 |
| 6 | 40 | 32 | 35 | 40 | 32 | 29.6 | 40 | 32 | 29 |
| 7 | 40 | 32 | 34 | 40 | 32 | 28.8 | 40 | 32 | 28 |
| 8 | 40 | 32 | 33 | 40 | 32 | 28 | 40 | 32 | 28 |
| 9 | 40 | 32 | 32 | 40 | 32 | 27.2 | 40 | 32 | 27 |

IMAGE PROCESSING DEVICE AND IMAGE PROCESSING METHOD

This nonprovisional application claims priority under 35 U.S.C. §119(a) on Patent Application No(s). 2002-162448 filed in JAPAN on Jun. 4, 2002, which is (are) herein incorporated by reference.

BACKGROUND OF THE INVENTION

1. Field of Invention

The present invention relates to data processing used for example in full-color printing related equipment, such as printers, video printers, scanners, or the like, and image processing equipment such as those for generating computer-graphics images, or display devices such as monitors, and in particular to an image processing device and method for image-processing the image data represented by three colors of red, green and blue, or yellow, cyan and magenta, to be suitable for the equipment used.

2. Description of Related Art

In the field of printing, color conversion is an essential image technology for compensating for deterioration of printed images, due to color-mixing property caused by the fact that inks are not of pure colors, and due to non-linearity of the image printing, and to output printed images with a good color reproducibility. In display devices such as monitors, color conversion is effected as image processing for outputting (displaying) an image with a desired color reproduction characteristics to be suitable for the conditions in which the device is used, in displaying the input color data. The color conversion can be realized by a table conversion method or a matrix calculation method.

A representative example of table conversion method is a three-dimensional look-up table method, in which image data represented by red, green and blue (hereinafter referred to as "R, G, B") are input, and image data of R, G, B, or complementary color data of yellow, magenta and cyan (hereinafter referred to as "Y, M and C" stored in advance in a memory, such as a ROM are output. This method permits use of any desired conversion characteristics so that color conversion with a good color reproducibility can be achieved.

A problem associated with the table conversion method is the size of the memory required. In a simple configuration in which, data to be output is stored for each combination of the input image data, a memory with a capacity of about 400 Mbits is needed. For instance, Japanese Patent Kokai Publication No. S63-227181 discloses a method of compressing the memory capacity, but the required capacity is still about 5 Mbits. Thus, this method requires a memory of a large capacity for each conversion characteristics, and it is difficult to implement the method by means of LSIs. Another problem is that the method cannot be flexibly adopted to changes in the use conditions or the like.

In the matrix calculation method, the following equation (1) is a basic calculation equation used for converting certain image data Ri, Gi, Bi to another image data Ro, Go, Bo.

$$\begin{bmatrix} Ro \\ Go \\ Bo \end{bmatrix} = (Aij) \begin{bmatrix} Ri \\ Gi \\ Bi \end{bmatrix} \quad (1)$$

In the equation (1), i=1 to 3, j=1 to 3.

When color conversion is performed by the matrix calculation according to the equation (1), no large memory is required, so that the method can be implemented easily by means of LSIs, and the method can be adopted flexibly to the changes in the use conditions. On the other hand, the conversion characteristics which can be realized are limited by the matrix calculation equation, and the flexibility in the conversion characteristics is inferior to the three-dimensional look-up table method.

It will thus be understood that the table conversion method and the matrix calculation method used for color conversion have respective advantages and disadvantages. A problem common to both methods is that the number of expressed colors is reduced by the color conversion, and the discontinuities (irregularities) in the change in the data occur.

FIG. 27 is a block diagram showing an example of configuration of a conventional image processing device. In FIG. 27, reference numeral 1 denotes a color converter. The color converter 1 performs color conversion on input color data R1, G1, B1 constituting input image data, to calculate and produce output color data R3, G3, B3 constituting output image data. The color data R1, G1, B1 represent red, green and blue, respectively. The color data R3, G3, B3 also represent red, green and blue, respectively. The color conversion that is performed at the color converter 1 may be that of the table conversion method, or of the matrix calculation method, as described above. In the following description, it is assumed that in the image processing device shown in FIG. 27, the output color data R3, G3, B3 are calculated by a matrix calculation according to the following equation (2).

$$\begin{bmatrix} R3 \\ G3 \\ B3 \end{bmatrix} = (Aij) \begin{bmatrix} R1 \\ G1 \\ B1 \end{bmatrix} \quad (2)$$

Here, it is assumed that each of the input color data R1, G1, B1, and the output color data R3, G3, B3 is six-bit data, and can express any value of 0 to 63. It is also assumed that each of the input color data R1, G1, B1 assumes all the values of 0 to 63, and the combination of the input color data R1, G1, B1 have 64*64*64=262,144 values. In other words, the input color data R1, G1, B1 can express 262,144 colors.

Let us assume that the matrix coefficients Aij used in the matrix calculation according to the equation (2) have values represented by the following equation (3).

$$(Aij) = \begin{bmatrix} 1.0 & 0.0 & 0.0 \\ 0.0 & 1.0 & 0.0 \\ 0.2 & -0.2 & 0.8 \end{bmatrix} \quad (3)$$

FIG. 28 shows the relationship between the input color data R1, G1, B1 input to the color converter 1, and the output color data R3, G3, B3 calculated by the color converter 1, for each of the nine values of the input color data (data No. 1 to No. 9), where-the matrix coefficients of the equation (3) are used. The nine values of input color data are such that the value of R1 is fixed at "40," the value of G1is fixed at "32," while the value of B1 is reduced from 40 to 32, one by one. In FIG. 28, Ra, Ga, Ba denote values of ideal output color data which would result if the output color data are not limited to six bits. Because the output color data R3, G3, B3 are in fact limited to six bits, the actual output color data R3, G3, B3 are those obtained by rounding Ra, Ga, Ba into six bit data. It is seen from FIG. 28 that the output color data R3, G3, B3 for the input color data R1=40, G1=32, B1=39, and the output color data R3, G3, B3 for the input color data R1=40, G1=32, B1=38 are both R3=40, G3=32, B3=32, i.e., of the same values. Also, the output color data R3, G3, B3 for the input color data R1=40, G1=32, B1=34, and the output color data R3, G3, B3 for the input color data R1=40, G1=32, B1=33 are both R3=40, G3=32, B3=28, i.e., of the same values.

As has been exemplified, a plurality of sets of input color data are converted to the same output color data, while the same input color data will not be converted to different sets of output color data, so that the number of colors that are expressed is reduced. That is, the number of colors expressed by the output color data R3, G3, B3 is smaller than 262,144.

FIG. 29 is a graph showing the relationship between the data numbers shown in FIG. 28, and the blue component B1 of the input color data, the value Ba of the blue component of the ideal output color data, and the blue component B3 of the output color data. It is seen from FIG. 29, that the blue component B1 of the input color data and the value Ba of the blue component of the ideal output color data vary smoothly, while the blue component B3 of the color data includes discontinuous (irregular) data change.

As has been described, the conventional image processing device and image processing method are associated with the problem that the number of colors that can be expressed is reduced by the color conversion. Moreover, the discontinuous (irregular) data change is generated by the color conversion. The color data output from the image processing device is supplied to an image display unit such as liquid crystal panel, and is displayed as an image. Thus, while the image display unit can express 262,144 colors, for instance, the number of colors expressed by the output color data R3, G3, B3 output from the image processing device is smaller than 262,144. This means that the capacity of the image display unit in terms of the number of colors which it can display cannot be fully utilized. Moreover, because of the discontinuity (irregularities) in the change of the data, the image will have parts where there is a larger or more sudden tone change and parts where there is a smaller or more gradual tone change, with the result that the reproduced image on the image display unit is not natural. In particular, if the an irregularity of the tone change occurs in the parts where the data varies gradually, a phenomenon called false edge by which an edge is seen as if it existed at a part where there is actually no edge.

The above described problems are more serious when the color data is changed to a larger extent by the color conversion at the color converter. There are different types of color reproduction, i.e., an "exact color reproduction" and a "preferred color reproduction." The "exact color reproduction" is an exact or faithful color reproduction that is as close as possible to the original image. To realize the exact color reproduction, it is necessary to perform color reproduction which matches with the method of generation of the input image data. Specifically, it can be conceived to perform color reproduction using a standard color space such as those of NTSC or sRGB. On the other hand, a "preferred color reproduction" is a color reproduction that is preferred by a human being, taking account of the characteristics of the human visual perception, and memory colors, and is not necessary identical with the "exact color reproduction."

In a color reproduction used for display of moving pictures, such as those of television pictures, a "preferred color reproduction" is often aimed at. In the memory colors of human beings, there is a tendency that the color of the sky, and the green color of the grass are memorized as colors which are brighter, or of a higher saturation. Accordingly, for realizing a "preferred color reproduction," color conversion to increase the chroma and lightness of the colors is often applied to the input color data, so that the colors are changed to a greater extent. Moreover, even in the "exact color reproduction," it is not rare that the colors are changed to a substantial extent. This is because the color gamut of the image display device is narrower than the color gamut of the color space used in the generation of the image data, or the standard color space.

The conventional image processing device or image processing method is thus associated with a problem that the number of colors expressed is reduced by the color conversion, and that discontinuities (irregularities) in the change of data are created by the color conversion. Since the color data output from the image processing device are input to an image display unit such as a liquid crystal panel, and an image corresponding to the color data is displayed, the reduction in the number of the colors expressed means that the capacity of the image display unit in terms of the number of colors which it can display is not fully utilized. Moreover, because of the discontinuities (irregularities) in the change of the data, there will be parts where the change in the tone is large or sudden, and the parts where the change in the tone is small or gradual, with the result that the reproduced image displayed on the image display unit may be unnatural.

SUMMARY OF THE INVENTION

The invention has been made to solve the problems described above, and its object is to provide an image processing device and image processing method which can realize an "exact color reproduction" or "preferred color reproduction," and at the same time restrain the reduction in the number of colors that can be expressed, and restrain the generation of the discontinuities (irregularities) in the change of data.

According to one aspect of the invention, there is provided image processing device receiving first image data consisting of a plurality of color data and constituting image information for each pixel, and calculating and outputting second image data comprising a plurality of color data, comprising:

a color converter for performing color conversion on the first image data; and a dither processor for applying dither processing to the image data obtained by the color conversion at the color converter, to obtain the second image data.

Accordingly, by performing dither processing on the image data obtained by performing color conversion at the color converter, it is possible to simulate data representing the fractional part (fraction of a unity, i.e., digits to the right of the decimal point) of the data generated by the color conversion, without increasing the number of bits of the second image data. Accordingly, it is possible to restrain the reduction in the number of colors that are expressed by the second image data, and to restrain the occurrence in the discontinuities (irregularities) of change in the second image data, while realizing an "exact color reproduction" or "preferred color reproduction" by the color conversion at the color converter.

If the number of colors is reduced through the image processing, the capacity of the image display unit, such as an LCD, performing image display, in terms of the number of colors that it can express cannot be fully utilized. According to the image processing device of the invention, it is possible to fully utilize the capacity of the image display unit in terms of the number of colors that can be expressed, and it is possible to obtain the desired color reproduction characteristics. Furthermore, the change in the data is more regular, and more natural images can be displayed by the image display unit, and it is possible to avoid occurrence of a phenomenon (false edges) in which edges are seen at places where they actually do not exist. These effects are obtained by performing the dither processing on the data obtained by the color converter and thereby preserving the information of the fractional part generated by the color conversion.

BRIEF DESCRIPTION OF THE DRAWINGS

In the accompanying drawings:

FIG. 3 shows an example of the dither coefficients used in the image processing device according to Embodiment 1 of the present invention;

FIG. 4A and FIG. 4B show an example of conversion from eight-bit color data to six-bit color data without dither processing;

FIG. 5A to FIG. 5D show an example of conversion from eight-bit color data to six-bit color data with dither processing;

FIG. 10A to FIG. 10D show an example of dither coefficients D(X, Y, V) used in the image processing device according to Embodiment 2 of the present invention;

FIG. 19 shows an example of the relationship between the identification code S1, the maximum value $\beta$, the minimum value $\alpha$, and the hue data that are zero in the image processing device according to Embodiment 4 of the present invention;

FIG. 20 shows the operation of the polynomial calculator 10 and the zero remover 13 in the image processing device according to Embodiment 4 of the present invention;

DETAILED DESCRIPTION OF THE PREFERRED EMBODIMENTS

Embodiments of the invention will now be described with reference to the drawings.

Embodiment 1

Figure 1:
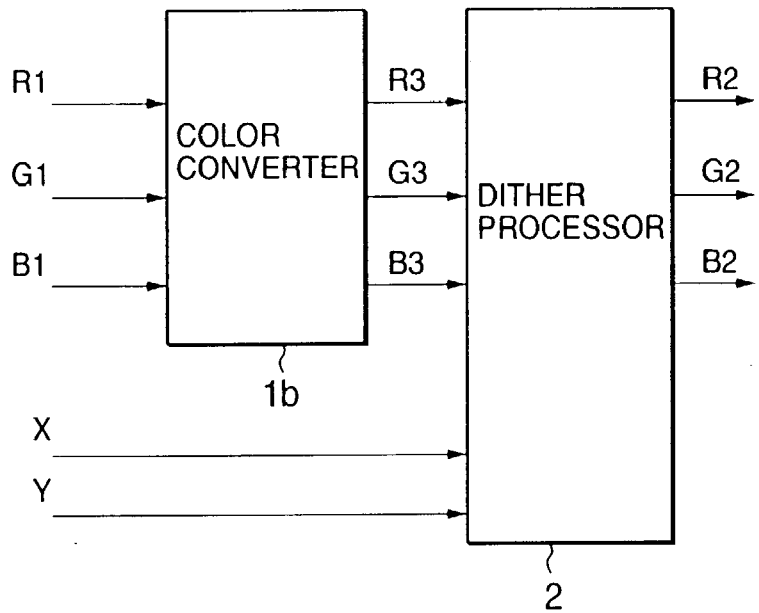
FIG. 1 is a block diagram showing an example of configuration of the image processing device according to Embodiment 1 of the present invention.

FIG. 1 is a block diagram showing an example of configuration of an image processing device according to the invention. The image processing device of this embodiment receives first image data consisting of a plurality of, e.g., three, color data, and constituting image information for each pixel, and calculates and outputs second image data consisting of a plurality of, e.g., three, color data.

In the drawing, reference numeral 1b denotes a color converter, and 2 denotes a dither processor. The first color data R1, G1, B1 constituting the first image data are input to the color converter 1b. The color converter 1b calculates, from the first color data R1, G1, B1, third color data R3, G3, B3 constituting third image data, which are output to the dither processor 2.

The color conversion performed at the color converter 1b may be of a table conversion method, or of a matrix calculation method. It is assumed that the image processing device shown in FIG. 1 performs matrix calculation according to the following equation (2) to produce the third color data R3, G3, B3.

$$\begin{bmatrix} R3 \\ G3 \\ B3 \end{bmatrix} = (Aij) \begin{bmatrix} R1 \\ G1 \\ B1 \end{bmatrix} \quad (2)$$

It is also assumed that the first color data R1, G1, B1 are six bit data, and can express any value of 0 to 63. It is further assumed that each of the first color data R1, G1, B1 assumes all the values of 0 to 63, and the combination of the first color data R1, G1, B1 can assume 64*64*64=262,144 values. In other words, the first color data R1, G1, B1 can express 262,144 colors. It is also assumed that third color data R3, G3, B3 are eight-bit data, and can express any value 0 to 255. Among the eight bits of the third color data R3, G3, B3, the lower two bits represent the fractional part (fraction of a unity, i.e., digits to the right of the decimal point), while the upper six bits represent the integer part. Accordingly, the third color data R3, G3, B3 represent a value with a resolution (accuracy) of ¼.

The dither processor 2 receives the third color data R3, G3, B3 output from the color converter 1b, and the data X, Y representing the pixel positions of the input third color data R3, G3, B3 within the image (screen). Here, data X, Y respectively represent the horizontal and vertical pixel positions of the input third color data within the screen, and supplied from an external image data supply unit, not shown, together with the first color data. If the image data are not associated with the data representing the above pixel positions, but are associated with a horizontal synchronous signal and a vertical synchronous signal, the data representing the pixel positions may be generated within the image processing device based on the horizontal synchronous signal and the vertical synchronous signal. For instance, if X=100, Y=200, the third color data which are concurrently input are those of the pixel which is at a 200th row and 100th column within the screen.

Figure 2:
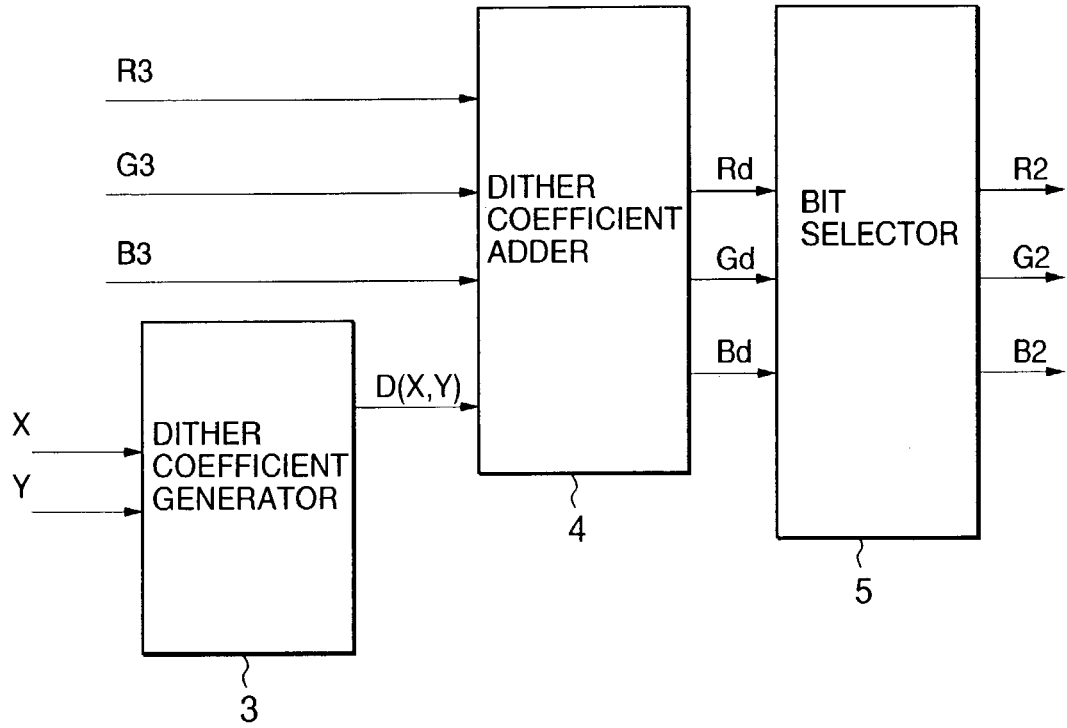
FIG. 2 is a block diagram showing an example of configuration of the dither processor 2 in the image processing device according to Embodiment 1 of the present invention.

FIG. 2 is a block diagram showing an example of configuration of the dither processor 2. In the drawing, reference numeral 3 denotes a dither coefficients generator, 4 denotes a dither coefficient adder, and 5 denotes a bit selector. The data X, Y representing the pixel positions are input to the dither coefficient generator 3. The dither coefficient generator 3 generates a dither coefficient D(X, Y) corresponding to the pixel position from the input data X, Y. The dither coefficient adder 4 receives the third color data R3, G3, B3, and the dither coefficients D(X, Y) from the dither coefficient generator 3. The dither coefficient adder 4 performs addition according to the following equation (4), to produce dither coefficient-added color data Rd, Gd, Bd. The dither coefficient-added color data Rd, Gd, Bd are eight-bit data, and its value is limited to 255, i.e., the dither coefficient-added color data Rd, Gd, Bd have a value 255 when the sum of the third color data and the dither coefficient exceeds 255.

Rd=R3+D(X, Y)

Gd=G3+D(X, Y)

Bd=B3+D(X, Y) (4)

The dither coefficient-added color data Rd, Gd, Bd are input to the bit selector 5. The bit selector 5 selects the upper six bits of each of the dither coefficient-added color data Rd, Gd, Bd, and outputs the selected data as the second color data R2, G2, B2 constituting the second image data. Accordingly, the second color data R2, G2, B2 are six-bit data.

Further description will be made in connection with specific numerical examples. Let us assume that the matrix coefficients Aij used for the matrix calculation of the equation (2) performed at the color converter 1b are as shown by the following equation (3), and the dither coefficient D(X, Y) generated at the dither coefficient generator 3 are as shown in FIG. 3.

$$(Aij) = \begin{bmatrix} 1.0 & 0.0 & 0.0 \\ 0.0 & 1.0 & 0.0 \\ 0.2 & -0.2 & 0.8 \end{bmatrix} \quad (3)$$

When the dither coefficient D(X, Y) generated at the dither coefficient generator 3 have a relationship as shown in FIG. 3, with respect to the values of the data X, Y representing the pixel position, the color data obtained by the bit selection after the addition of the dither coefficient (obtained by the dither processing) can simulate information two bits more than the actual number of bits. For instance, the six bit data obtained through dither processing can simulate eight-bit information. The effects of the dither processing will next be described with reference to FIG. 4A, FIG. 4B, FIG. 5A and FIG. 5B.

FIG. 4A and FIG. 4B show an example of conversion from eight-bit color data to six-bit color data without dither processing. The values shown in FIG. 4A are those of the eight-bit color data before the conversion. The values shown in FIG. 4B are those of the six-bit color data after the conversion. The squares depicted by partitions in FIG. 4A and FIG. 4B represent pixels for which respective color data exist. For simplicity, FIG. 4A and FIG. 4B show that each pixel has just one color data. In the case shown in FIG. 4A and FIG. 4B, in which no dither processing is performed, the lower two bits of eight-bit data are simply omitted, in producing six-bit color data. As a result, the data represented by the lower two bits are completely lost, and the four values "64," "65," "66," and "67" in eight-bit color data, are all converted to the same value of "16" in the six-bit color data.

FIG. 5A and FIG. 5B show an example of conversion from eight-bit color data to six-bit color data with dither processing. The values shown in FIG. 5A are those of eight-bit color data. The squares depicted by the partitions in FIG. 5A to FIG. 5D represent pixels for which the respective color data exist. For simplicity, FIG. 5A to FIG. 5D show that each pixel has just one color data. FIG. 5B shows dither coefficients which are added to the corresponding color data shown in FIG. 5A, and which are generated according to the rule shown in FIG. 3. FIG. 5C shows eight-bit dither coefficient-added color data obtained by addition of the dither coefficients shown in FIG. 5B to the eight-bit data in FIG. 5A. FIG. 5D shows six-bit color data obtained by conversion of the dither coefficient-added color data to six-bit color data, by omitting the lower two bits from the dither coefficient-added color data shown in FIG. 5C. When four pixels (two vertically aligned ones by two horizontal aligned ones) are seen as a unit (i.e., in combination), the six-bit color data shown in FIG. 5D preserves the information of the lower two bits having been omitted.

As has been described, by performing dither processing using the dither coefficients shown in FIG. 3, it is possible to express information two bit more than the actual number of bits, when four pixels are seen as a unit (i.e., in combination). That is, by performing dither processing using the dither coefficients shown in FIG. 3, it is possible to simulate information two bit more than the actual number of bits. The present embodiment uses the dither coefficients shown in FIG. 3, as an example, but the dither processing may be performed using various other dither coefficients, to simulate information more than the actual number of bits.

Figures 6, 7:
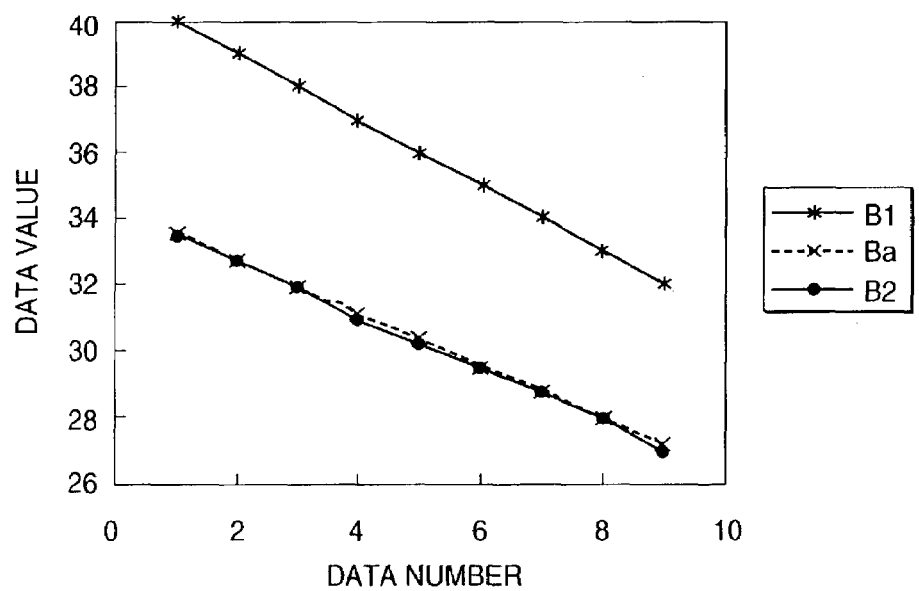
FIG. 6 shows the relationship between the first color data R1, G1, B1 and the second color data R2, G2, B2 in the image processing device according to Embodiment 1 of the present invention.
FIG. 7 shows the relationship between the data numbers, the blue component B1 of the first color data, the value Ba of the ideal second color data, and the blue component B2 of the second color data in the image processing device according to Embodiment 1 of the present invention.

FIG. 6 shows the relationship between the first color data R1, G1, B1 input to the color converter 1b, and the second color data R2, G2, B2 calculated by the color converter 1b, for nine values (data numbers 1 to 9) of the first color data, under the condition that the matrix coefficients Aij used in the matrix calculation performed at the color converter 1b according to the equation (2) are as those shown by the equation (3), and the dither coefficients D(X, Y) generated by the dither coefficient generator 3 are as shown in FIG. 3. The nine values of the first color data shown in FIG. 6 are such that the value of R1 is fixed at "40," and the value of G1 is fixed at "32," while the value of B1 is reduced one by one, from "40" to "32." In FIG. 6, Ra, Ga, Ba represent the values of the ideal second color data which would be obtained if each of the color data constituting the image data were not restricted to six bits. R3, G3, B3 represent eight-bit third data output from the color, converter 1b. The eight-bit third color data output from the color converter are converted to the six-bit second color data R2, G2, B2 by dither processing at the dither processor 2, so that the second color data can simulate information of 8 bits, i.e., with a resolution (accuracy) of ¼ (0.25). As a result, the phenomenon that occurred with the conventional image processing device, in which both of the combination of R1=40, G1=32, B1=39, and the combination of R1=40, G1=32, B1=38 result in the same color data, and both of the combination of R1=40, G1=32, B1=34, and the combination of R1=40, G1=32, B1=33 result in the same color data does not occur.

FIG. 7 shows the relationship between the data number also shown in FIG. 6 and the blue component B1 of the first color data, the value Ba of the blue component of the ideal second color data, and the blue component B2 of the second color data. It is seen from FIG. 7, that the blue component B2 of the second color data is fairly close to the value Ba of the blue component of the ideal second color data, and changes smoothly.

As has been described, according to the image processing device of the invention, it is possible to simulate, without increasing the number of bits, the fractional part which are generated by the color conversion at the color converter, by performing dither processing on the color data having been obtained by the color conversion. Accordingly, it is possible to realize an "exact color reproduction" or "preferred color reproduction" by means of the color conversion at the color converter, and at the same time it is also possible to restrain the reduction in the number of colors that are expressed, and it is also possible to restrain generation of discontinuities (irregularities) in the data change.

The reduction in the number of colors expressed by the image processing means that the capacity of the image display unit, such as LCD, used for the image display, in terms of the number of colors displayed, cannot be fully utilized. According to the image processing device of the invention, the capacity of the image display unit, in terms of the number of colors that can be displayed, can be fully utilized, and at the same time a desired color reproduction can also be obtained. Moreover, the change in the data will be more regular, and the images displayed by the data display unit will be more natural, and it is also possible to avoid the phenomenon (false edges) in which an edge which actually does not exist is seen as if it were present. This is because the information of the fractional part generated by the color conversion is preserved (rather than omitted), by performing the dither processing on the data obtained by the color conversion.

The above embodiment has been described on the assumption that the device is implemented by hardware. But similar functions are obtained even when the device is implemented by software. Moreover, in the embodiment described, the first color data consist of three color data representing red, green and blue. The invention is applicable to situations where the first color data consist of four or more color data.

In the embodiment described, the first color data, and the second color data are both of six bits, so that the number of bits of the first color data and the number of bits of the second color data are equal. However, the invention is applicable where the number of bits of the first color data and the number of bits of the second color data are not equal. For instance, it may be that the first color data are of eight bits, and the second color data are of six bits. In this case, the second color data simulate the information of 256*256*256 (=about 16,777 thousand) colors of the first color data.

Embodiment 2

Figure 8:
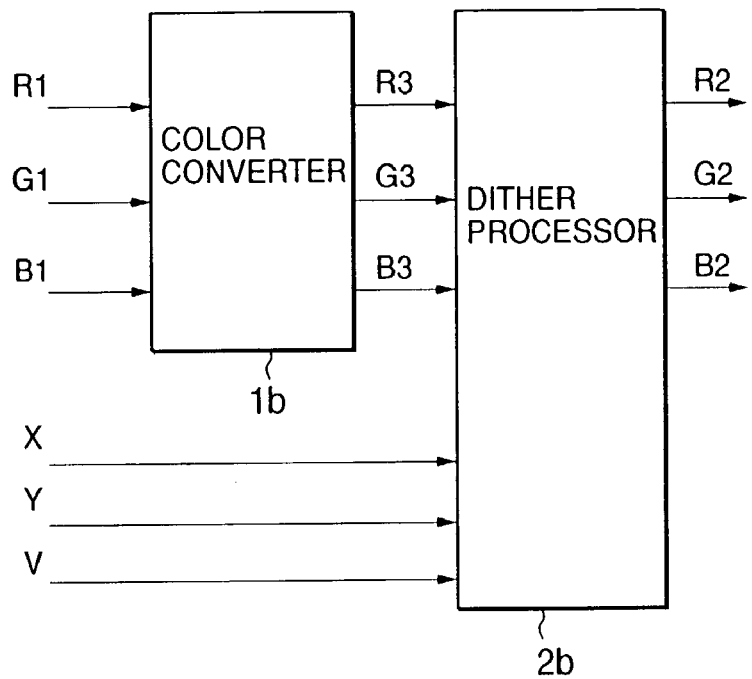
FIG. 8 is a block diagram showing an example of configuration of the image processing device according to Embodiment 2 of the present invention.
Figure 9:
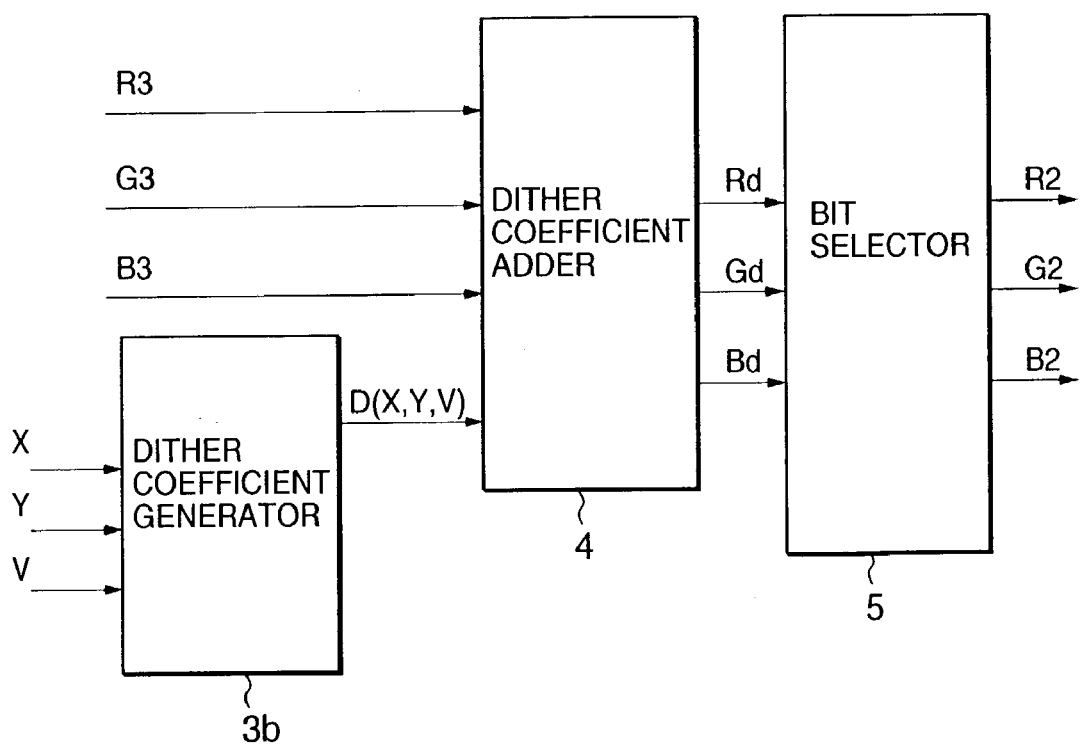
FIG. 9 is a block diagram showing an example of configuration of the dither processor 2b in the image processing device according to Embodiment 2 of the present invention.

The image processing device and image processing method according to the invention may be modified such that the dither coefficients used in the dither processor are altered every frame of the image (i.e., frame by frame). FIG. 8 is a block diagram showing an example of configuration of an image processing device of Embodiment 2 of the invention. In FIG. 8, reference numeral 1b denotes the same element as that shown in FIG. 1 relating to Embodiment 1. Reference numeral 2b denotes a dither processor according to Embodiment 2. FIG. 9 is a block diagram showing an example of configuration of the dither processor 2b. In FIG. 9, reference numerals 4 and 5 denote the same elements as those shown in FIG. 2 relating to Embodiment 1. Reference numeral 3b denotes a dither coefficient generator according to the present embodiment.

The image processing device according to the present embodiment differs from that of Embodiment 1 in the configuration of the dither coefficient generator 3b in the dither processor 2b. The dither coefficient generator 3 in Embodiment 1 generates the dither coefficients D(X, Y) from the data X, Y representing the horizontal and vertical positions of the pixels. In contrast, the dither coefficient generator 3b according to the present embodiment generates the dither coefficients D(X, Y, V) using not only the data X, Y representing the horizontal and vertical positions of the pixels, but also the data or signal V (which is formed of a vertical synchronous signal, and is supplied from the image data supply source, not shown, together with the first color data) indicating the switching of the frame in which the color data exist.

FIG. 10A to FIG. 10D show an example of the dither coefficients D(X, Y, V) generated at the dither coefficient generator 3b. In the initial state, the dither coefficient generator 3b generates the dither coefficients shown in FIG. 10A. After that, the dither coefficients generated are successively switched to those shown in FIG. 10B, FIG. 10C, FIG. 10D, FIG. 10A, FIG. 10B, . . . , in response to the input of the data V representing the switching of the frame.

If the dither coefficients used are fixed regardless of the image frame, the configuration is simple, but the dither coefficients added by the dither processing may appear as a fixed noise in the image. In contrast, in the image processing device of the present embodiment, the dither coefficients added at each pixel position is altered every frame, so that the effects of the addition of the dither coefficient is temporally dispersed, and is not recognized as a fixed noise.

The above embodiment has been described on the assumption that the device is implemented by hardware. But similar functions are obtained even when the device is implemented by software. Moreover, in the embodiment described, the first color data consist of three color data representing red, green and blue. The invention is applicable to situations where the first color data consist of four or more color data.

Embodiment 3

Figure 11:
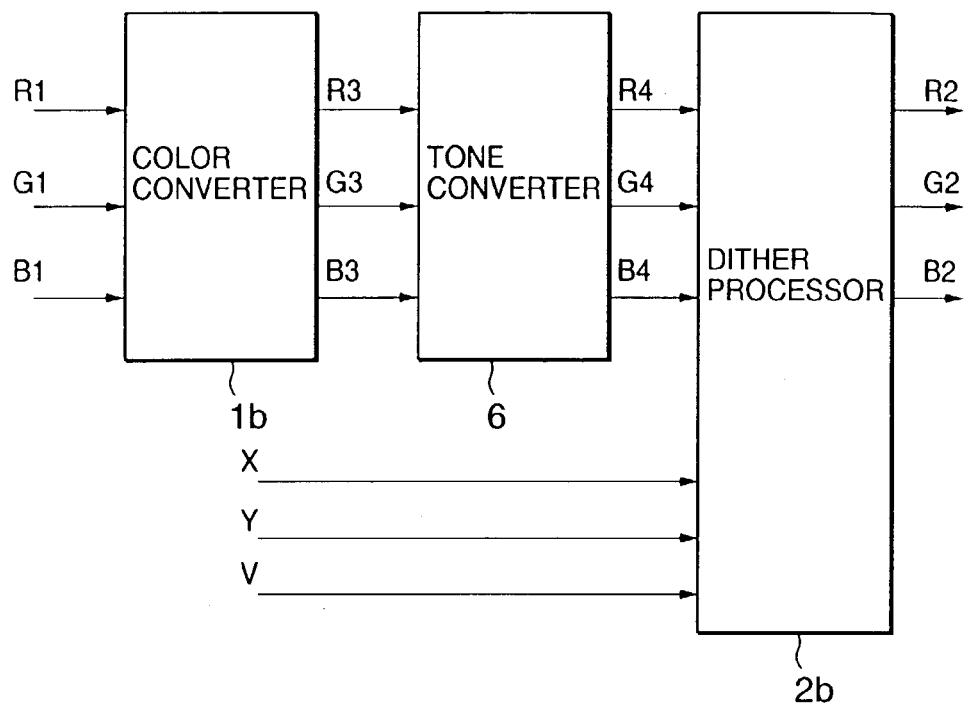
FIG. 11 is a block diagram showing an example of configuration of the image processing device according to Embodiment 3 of the present invention.

FIG. 11 is a block diagram showing an example of configuration of an image processing device according to the invention. In FIG. 11, reference numerals 1b and 2b denote the same elements as those shown in FIG. 8 relating to Embodiment 2. Reference numeral 6 denotes a tone converter. The first color data R1, G1, B1 constituting the first image data are input to the color converter 1b. The color converter 1b calculates the third color data R3, G3, B3 constituting the third image data from the first color data R1, G1, B1, and supplies the third color data to the tone converter 6.

The color conversion performed at the color converter 1b may be of a table conversion method, or of a matrix calculation method. The image processing device shown in FIG. 11 is assumed to calculate the third color data R3, G3, B3, by the matrix calculation of the following equation (2).

$$\begin{bmatrix} R3 \\ G3 \\ B3 \end{bmatrix} = (Aij) \begin{bmatrix} R1 \\ G1 \\ B1 \end{bmatrix} \quad (2)$$

Here, the first color data R1, G1, B1 are assumed to be of six bits, and can represent any value from 0 to 63. It is also assumed that each of R1, G1, B1 of the first color data R1, G1, B1 assumes all of the values of 0 to 63, and the combination of the first color data R1, G1, B1 will have 64*64*64=262,144 values. In other words, the first color data R1, G1, B1 can express 262,144 colors. On the other hand, the third color data R3, G3, B3 are of eight bits, and can express any value of 0 to 255. But lower two bits of the eight bits of the third color data R3, G3, B3 represent the fractional part, and the upper six bits represent the integer part. Accordingly, the third color data R3, G3, B3 will have a resolution (accuracy) of ¼.

The tone converter 6 performs tone conversion on the input third color data, and produces and outputs fourth color data R4, G4, B4 constituting fourth image data. The fourth color data R4, G4, B4 are of eight bits, and can express any value of 0 to 255. Like the third color data R3, G3, B3, the lower two bits of the eight bits of the fourth color data R4, G4, B4 represent the fractional part, while the upper six bits represent the integer part. The tone conversion performed at the tone converter 6 is for correcting or compensating for the undesirable tone characteristics of the image display unit that is used, or for realizing the tone characteristics according to the user's preference, or to the environmental conditions. For instance, a liquid crystal module often has an S-shaped tone characteristics, while the image supplied is often generated on the assumption that the image display unit has a tone characteristics expressed by a power function. In this case, if no tone conversion were applied, the tone characteristics of the image display device differs from that assumed at the time when the image was generated, so that the image displayed is different from that intended.

Figure 12:
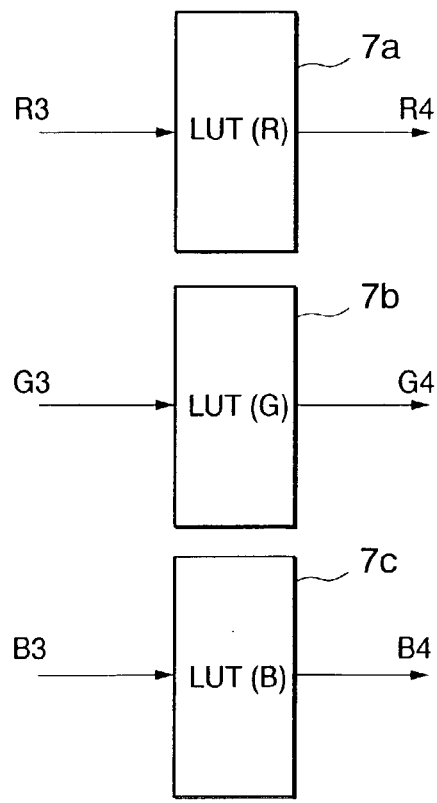
FIG. 12 is a block diagram showing an example of configuration of the tone converter 6 in the image processing device according to Embodiment 3 of the present invention.

FIG. 12 is a block diagram showing an example of configuration of the tone converter 6. In FIG. 12, reference numerals 7a, 7b, and 7c denote look-up tables. The look-up tables 7a, 7b, and 7c store the values of the fourth color data R4, G4, B4, at the addresses (memory locations) designated by the input data which are input as the read address. The look-up table 7a receives the red component R3 of the third color data as the read address, and the red component R4 of the fourth color data stored at the address or the memory location designated by the red component R3 of the third color data is read and output. Similarly, the look-up table 7b receives the green component G3 of the third color data as the read address, and the green component G4 of the fourth color data stored at the address or the memory location designated by the green component G3 of the third color data is read and output. Similarly, the look-up table 7c receives the blue component B3 of the third color data as the read address, and the blue component B4 of the fourth color data stored at the address or memory location designated by the blue component B3 of the third color data is read and output.

Figure 13:
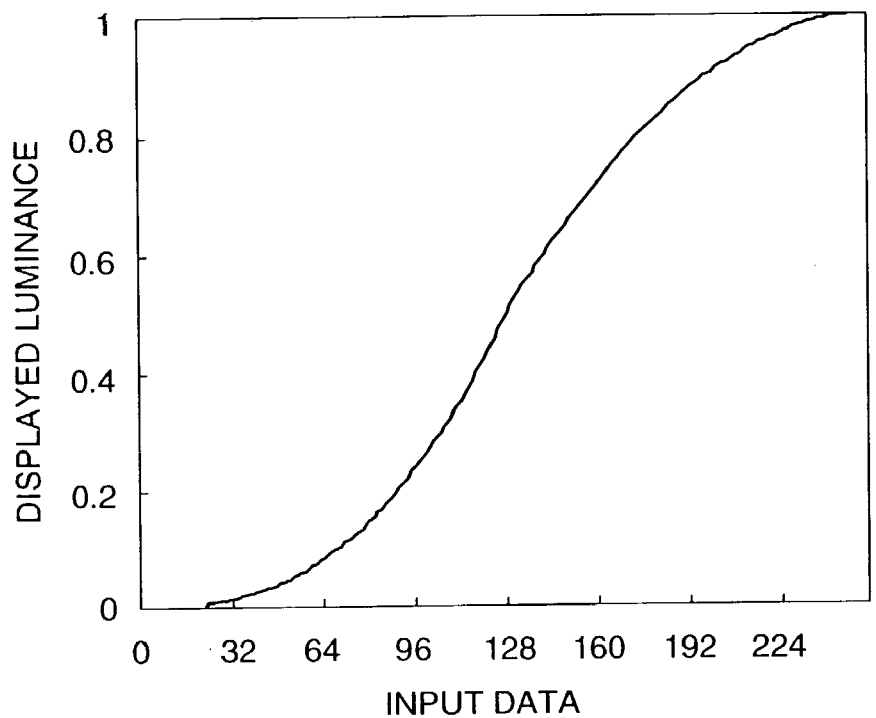
FIG. 13 shows an example of tone characteristics of the image display unit used for display of image data having been processed by the image processing device according to Embodiment 3 of the present invention.
Figure 14:
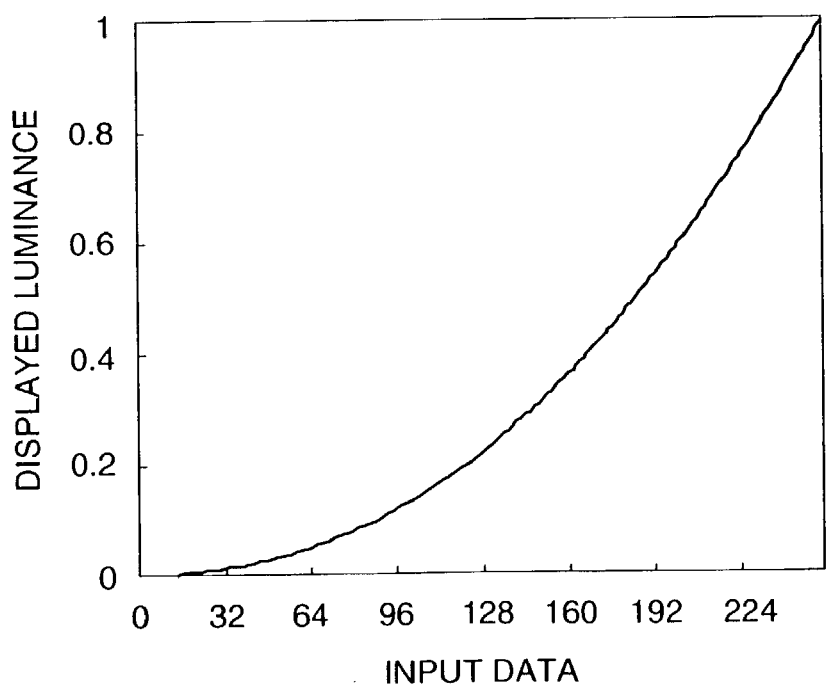
FIG. 14 shows an ideal tone characteristics.

FIG. 13 to FIG. 16 show an example of tone conversion performed by the tone converter 6. FIG. 13 shows an example of tone characteristics of the image display unit used for the display of the image data having been processed by the image processing device of the present embodiment. In FIG. 13, the horizontal axis represents the magnitude of the input data, while the vertical axis represents the normalized displayed luminance on the screen. It is seen from FIG. 13, that the image display unit of this example has an S-shaped tone characteristics. In describing the tone conversion, it is assumed for convenience of description, that the image display unit can display data of 8 bits. FIG. 14 shows the ideal tone characteristics. In FIG. 14, the horizontal axis represents the magnitude of the input data, while the vertical axis represents the normalized displayed luminance on the screen. As the tone characteristics of the image display devices, a tone characteristics expressed by a power function, which is a tone characteristics of a standard CRT, has now become a standard.

Figure 15:
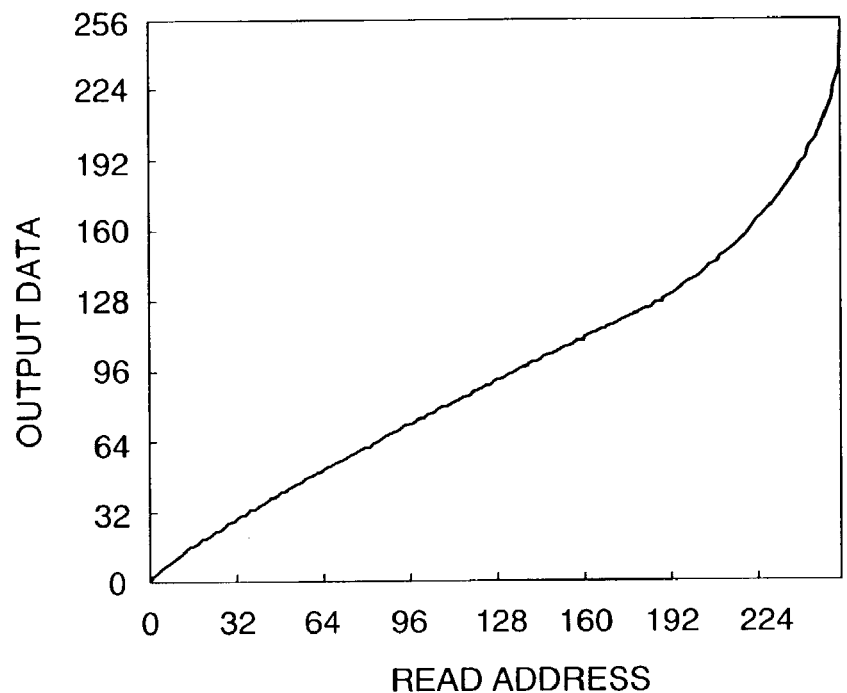
FIG. 15 shows the contents of a look-up table for realizing the tone characteristics of FIG. 14.
Figure 16:
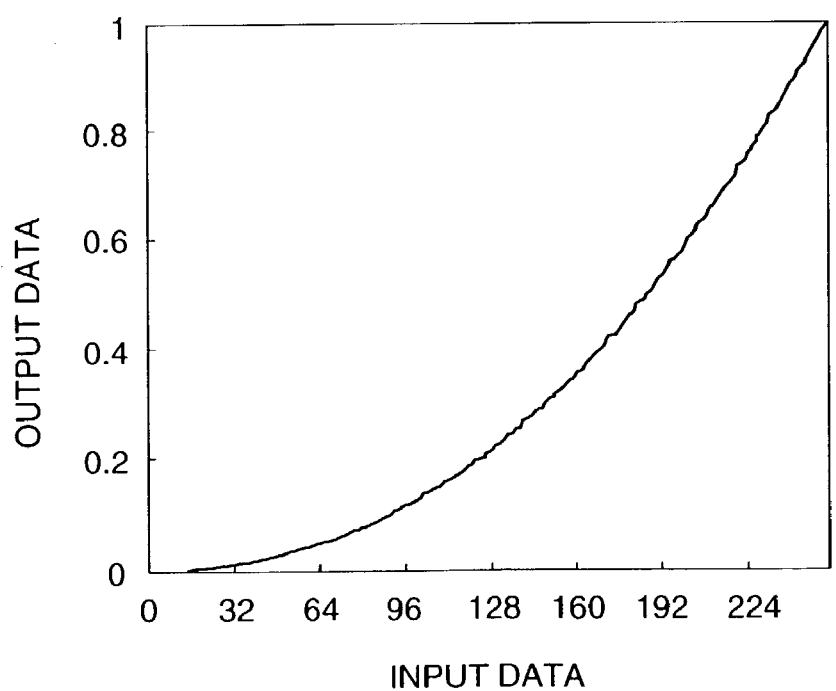
FIG. 16 shows the tone characteristics obtained when the tone conversion is performed using a look-up table having the contents as shown in FIG. 15, and then display is performed by a display unit having a tone characteristics as shown in FIG. 13.

FIG. 15 shows the contents of a look-up table for realizing the tone characteristics shown in FIG. 14. In FIG. 14, the horizontal axis represents the read address, while the vertical axis represents the data stored at the memory location designated by the read address. FIG. 16 shows the toner characteristics obtained when the tone conversion is performed using the look-up table of FIG. 15, and display is thereafter performed using an image display unit having a tone characteristics shown in FIG. 13, i.e., the tone characteristics of the combination of the look-up table having a tone characteristics shown in FIG. 15, and the image display unit having a tone characteristics shown in FIG. 13. In FIG. 16, the horizontal axis represents the input data before the toner conversion, while the vertical axis represents the luminance displayed on the screen of the image display unit. It will be understood that a tone characteristics very close to the ideal tone characteristics is obtained.

The fourth color data R4, G4, B4 obtained by the tone conversion at the tone converter 6 are supplied to the dither processor 2b. The dither processor 2b receives, not only the fourth color data R4, G4, B4 from the tone converter 6, but also the data X, Y representing the horizontal and vertical pixel positions of the input fourth color data within the image (screen), and the data V representing the switching of the frame in which the color data exist.

The dither processor 2b generates the dither coefficients D(X,Y,V), and adds the generated dither coefficients to the fourth color data R4, G4, B4, and performs the bit selection to produce the second color data R2, G2, B2 constituting the second image data. The above operation is the same as that described in connection with Embodiment 2. The second color data R2, G2, B2 are six-bit data, but can simulate eight-bit information because of the effects of the dither processing.

As has been described, according to the image processing device of the invention, dither processing is applied to the color data obtained by the color conversion at the color converter, and the tone conversion at the tone converter, and it is possible to simulate the data representing the fractional part generated by the tone conversion, without increasing the number of bits. Accordingly, it is possible to restrain the reduction in the number of colors that can be displayed, and restrain the generation of discontinuities (irregularities) in the data change, while realizing an "exact color reproduction" or "preferred color reproduction" by means of the color conversion at the color converter, and realizing a desired tone characteristics by means of the tone conversion at the tone converter.

The above embodiment has been described on the assumption that the device is implemented by hardware. But similar functions are obtained even when the device is implemented by software. Moreover, in the embodiment described, the first color data consist of three color data representing red, green and blue. The invention is applicable to situations where the first color data consist of four or more color data.

Embodiment 4

Figure 17:
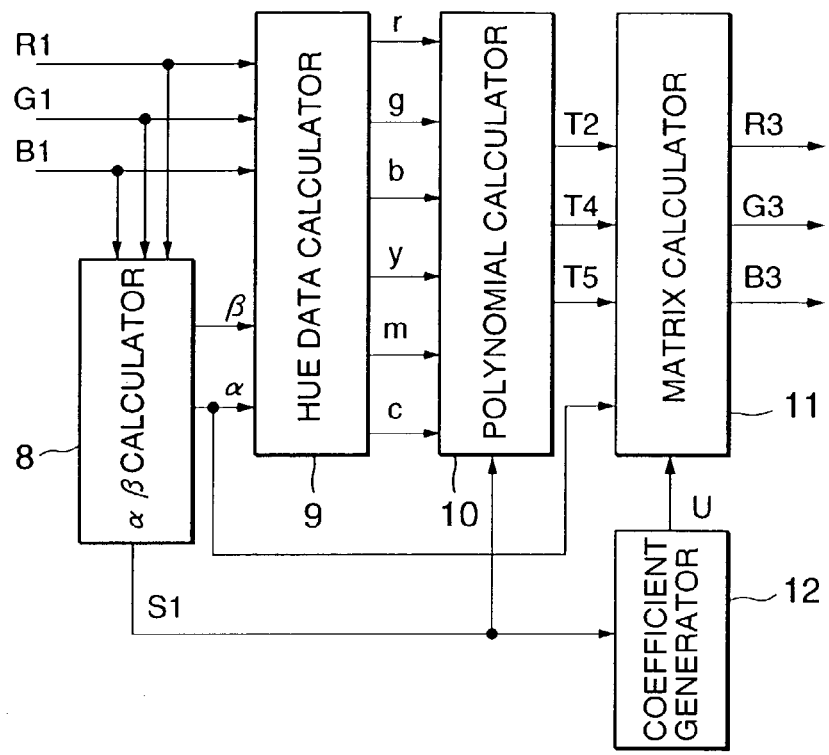
FIG. 17 is a block diagram showing an example of configuration of the color converter 1b in the image processing device according to Embodiment 4 of the present invention.

FIG. 17 is a block diagram showing an example of configuration of a color converter 1b in an image processing device according to Embodiment 4 of the present invention. In FIG. 17, reference numeral 8 denotes an α β calculator which calculates and outputs the maximum value β and the minimum value α of the input first color data R1, G1, B1, and also generates and outputs an identification code that indicates which of the hue data are zero. Reference numeral 9 denotes a hue data calculator calculating hue data r, g, b, y, m, c based on the first color data R1, G1, B1, and the outputs of the α β calculator 8. Reference numeral 10 denotes a polynomial calculator, 11 denotes a matrix calculator, and 12 denotes a coefficient generator. The configuration other than the color converter 1b may be identical to that of Embodiment 1, Embodiment 2, or Embodiment 3.

Figure 18:
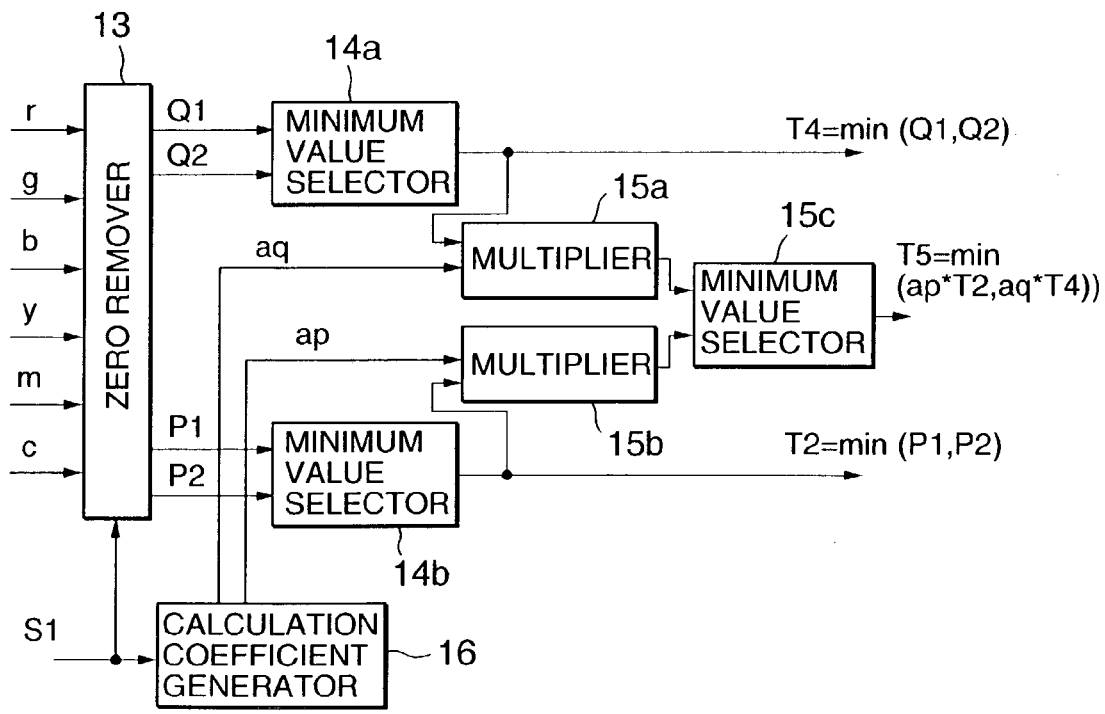
FIG. 18 is a block diagram showing an example of configuration of the polynomial calculator 10 in the image processing device according to Embodiment 4 of the present invention.

FIG. 18 is a block diagram showing an example of configuration of the polynomial calculator 10. In FIG. 18, reference numeral 13 denotes a zero remover removing the hue data (among the input hue data) which are zero. Reference numerals 14a, 14b, 14c denote minimum value selectors which select and output the minimum value of the input data. Reference numeral 16 denotes a calculation coefficient generator for generating calculation coefficients based on the identification code from the α β calculator 1, and outputting the generated coefficients. Reference numerals 15a, 15b denote multipliers multiplying the outputs of the minimum value selectors 14a and 14b by the calculation coefficients from the calculation coefficient generator 16.

The operation will next be described. The input first color data R1, G1, B1 are supplied to the α β calculator 8 and the hue data calculator 9. The α β calculator 8 calculates and outputs the maximum value β and the minimum value α of the first color data R1, G1, B1, and generates and outputs the identification code S1 which identifies which of the first color data R1, G1, B1 are the maximum value and the minimum value.

The hue data calculator 9 receives the first color data R1, G1, B1, and the maximum value β and minimum value α output from the α β calculator 8, and performs the subtraction:

$r = R1 - \alpha$, $g = G1 - \alpha$, $b = B1 - \alpha$, and $y = \beta - B1$, $m = \beta - G1$, $c = \beta - R1$ to produce the six hue data r, g, b, y, m, c.

The maximum value β and minimum value a calculated at the α β calculator 8 are given by:

$\beta = \mathrm{MAX}(R1, G1, B1)$, $\alpha = \mathrm{MIN}(R1, G1, B1)$, and the six hue data r, g, b, y, m, c calculated at the hue data calculator 16 are given by the subtraction:

$r = R1 - \alpha$, $g = G1 - \alpha$, $b = B1 - \alpha$, and $y = \beta - B1$, $m = \beta - G1$, $c = \beta - R1$, so that the six hue data have such a characteristics that at least two of them are zero. For instance, when R1 is the maximum, and G1 is the minimum (β=R1, α=G1), the above subtraction will result in g=0, and c=0. When R1 is the maximum and B1 is the minimum (β=R1, α=B1), b=0, and c=0.

That is, at least one of r, g, b is zero, and at least one of y, m, c is zero, and two in total are zero, and which of them are zero depend on the combination of R1, G1 or B1 which is the maximum, and R1, G1 or B1 which is the minimum.

The α β calculator 8 generates and outputs the identification code S1 identifying which of the six hue data are zero. The identification code S1 assumes one of six-values depending on which of R1, G1, B1 is the maximum and which of R1, G1, B1 is the minimum. FIG. 19 shows the relationship between the identification code S1, the maximum value β and minimum value α, and the hue data that are zero. The value of the identification code S1 shown in FIG. 19 is just an example, and the identification code may assume other values.

The six hue data r, g, b, y, m, c output from the hue data calculator 9 are supplied to the polynomial calculator 10. The polynomial calculator 10 is also supplied with the identification code S1 from the α β calculator 8, and performs calculation using two non-zero data Q1, Q2 among r, g, b and two non-zero data P1, P2 among y, m, c.

The hue data from the hue data calculator 9 and the identification code S1 from the α β calculator 8 are input to the zero remover 13 in the polynomial calculator 10. Based on the identification code S1, the zero remover 13 outputs two non-zero data of r, g, b as Q1, Q2, and two non-zero data of y, m, c as P1, P2. Q1, Q2, P1, P2 are determined as shown in FIG. 20, and output. For instance, when the identification code S1=0, r, b are used as Q1, Q2, and y, m are used as P1, P2, as will be seen from FIG. 19 and FIG. 20, and Q1=r, Q2, =b, P1=m, P2=y are output. Like FIG. 19, the values of the identification code S1 in FIG. 20 are just an example, and the values of the identification code S1 are not limited to those shown in FIG. 20.

The minimum value selector 14a selects and outputs the minimum value T4=min (Q1, Q2) of the output data Q1, Q2 of the zero remover 13, while the minimum value selector 14b selects and outputs the minimum value T2=min (P1, P2) of the output data P1, P2 of the zero remover 13. The values T4 and T2 output from the minimum value selectors 14a and 14b constitute the first arithmetic terms.

The calculation coefficient generator 16 is supplied with the identification code S1 from the α β calculator 8, and generates, based on the identification code S1, signals representing calculation coefficients aq, ap used for multiplication with the first arithmetic terms T4 and T2 at the multipliers 15a, 15b, and supplies the calculation coefficient aq to the multiplier 15a and the calculation coefficient ap to the multiplier 15b.

The values of the calculation coefficients aq, ap vary depending on the identification code S1. That is, as the identification code S1 has six values as shown in FIG. 20, each of the calculation coefficients aq, ap has six values corresponding to the six values of the identification code S1. The multiplier 15a receives the first arithmetic term T4 from the minimum value selector 14a, and performs multiplication (aq×T4) of the first arithmetic term T4 with the calculation coefficient aq from the calculation coefficient generator 16, and supplies the output (product) to the minimum value selector 14c. The multiplier 15b receives the first arithmetic term T2 from the minimum value selector 14b, and performs multiplication (ap×T2) of the first arithmetic term T2 with the calculation coefficient ap from the calculation coefficient generator 16, and supplies the output (product) to the minimum value selector 14c.

The minimum value selector 14c selects and outputs the minimum value T5=min (ap×T2, aq×T4) of the outputs of the multipliers 15a and 15b. The output T5 of the minimum value selector 14c constitutes the second arithmetic term. The polynomial data T2, T4, T5 described above are the outputs of the polynomial calculator 10. The outputs of the polynomial calculator 10 are supplied to the matrix calculator 11.

The coefficient generator 12 shown in FIG. 17 generates calculation coefficients U(Fij) for the polynomial data, based on the identification code S1, and supplies the generated coefficients to the matrix calculator 11. The matrix calculator 11 receives the first color data R1, G1, B1, the polynomial data T2, T4, T5 from the polynomial calculator 10, the minimum value α from the α β calculator 8, and the coefficients U from the coefficient generator 12, performs matrix calculation in accordance with the following equation (5), and outputs the results of the calculation as the third color data R3, G3, B3.

$$\begin{bmatrix} R3 \\ G3 \\ B3 \end{bmatrix} = \begin{bmatrix} R1 \\ G1 \\ B1 \end{bmatrix} + (Fij) \begin{bmatrix} T2 \\ T4 \\ T5 \\ \alpha \end{bmatrix} \quad (5)$$

In the equation (5), for (Fij), i=1 to 3, j=1 to 4.

Figure 21:
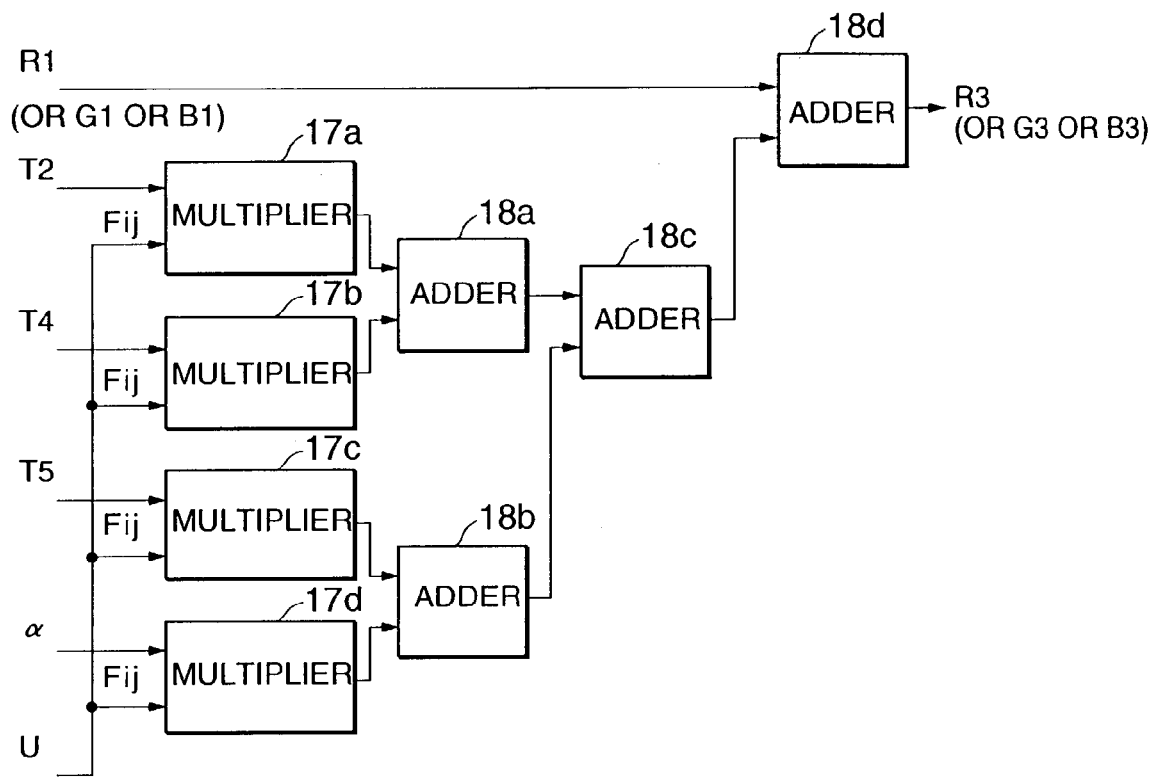
FIG. 21 is a block diagram showing an example of configuration of part of the matrix calculator 11 in the image processing device according to Embodiment 4 of the present invention.
Figure 22A:
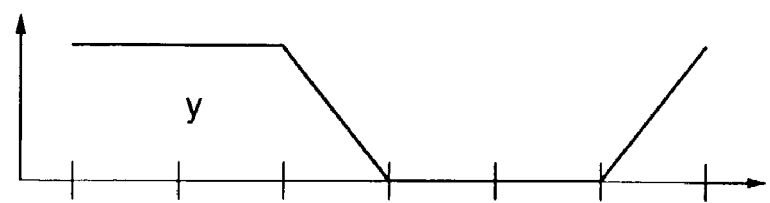
FIG. 22A to FIG. 22F schematically illustrate the relationship between the six hues and hue data.
Figure 22B:
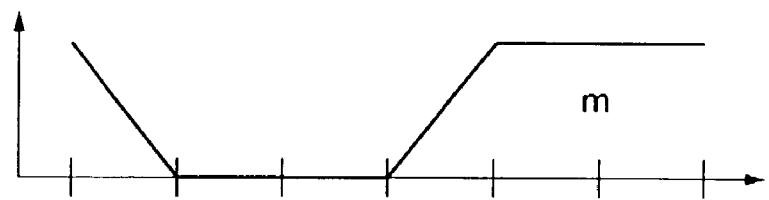
Figure 22C:
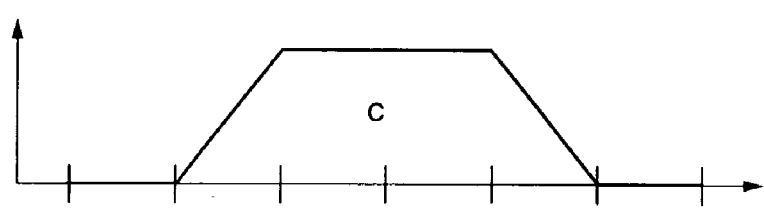
Figure 22D:
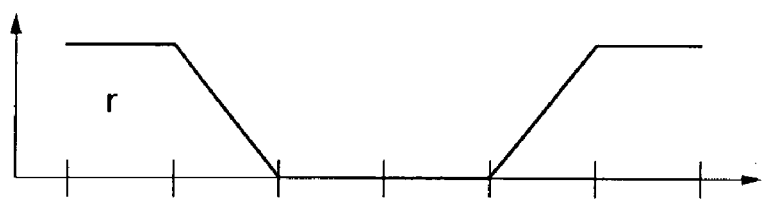
Figure 22E:
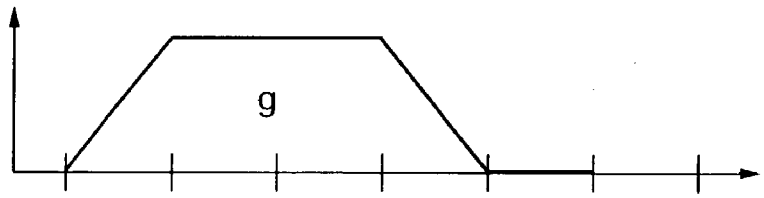
Figure 22F:
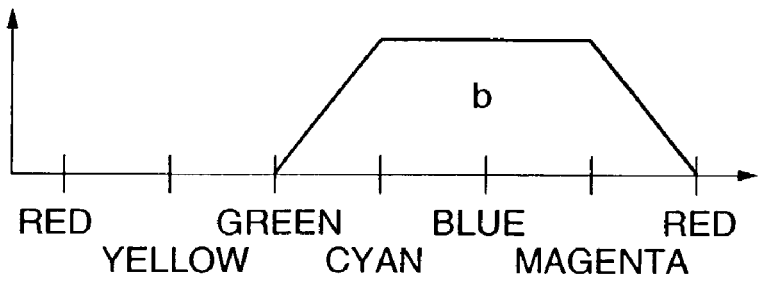
Figure 23A:
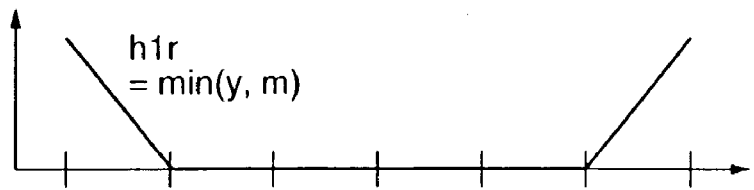
FIG. 23A to FIG. 23F schematically illustrate the relationship between the first arithmetic terms and the hues in image processing device according to Embodiment 4 of the present invention.
Figure 23B:
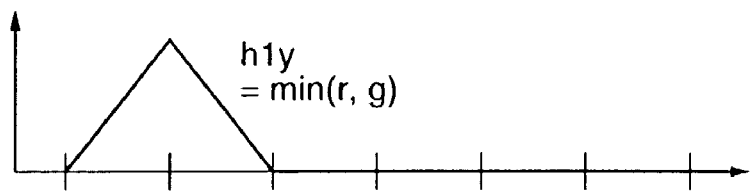
Figure 23C:
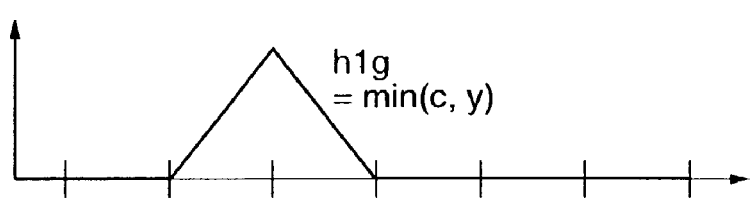
Figure 23D:
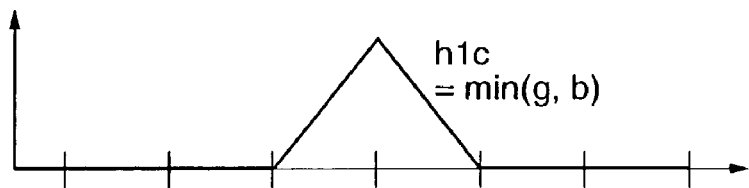
Figure 23E:
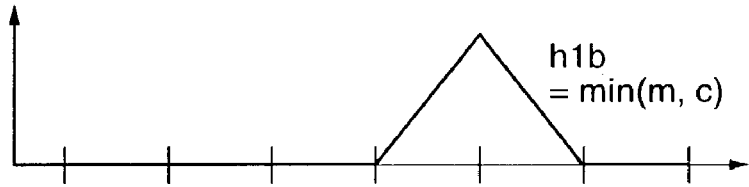
Figure 23F:
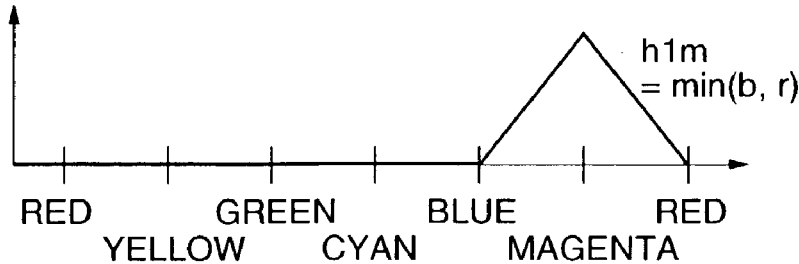
Figure 24A:
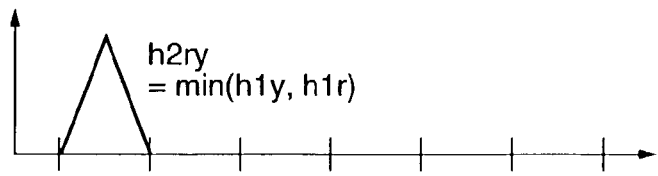
FIG. 24A to FIG. 24F schematically illustrate the relationship between the second arithmetic terms and the hues in the image processing device according to Embodiment 4 of the present invention.
Figure 24B:
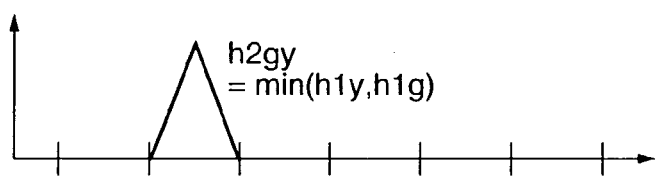
Figure 24C:
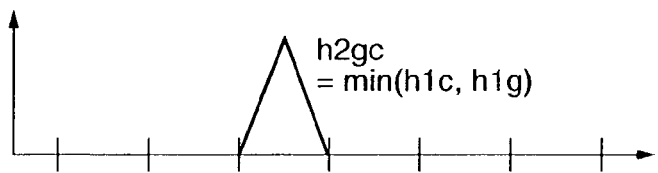
Figure 24D:
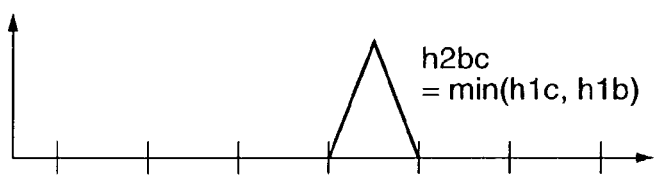
Figure 24E:
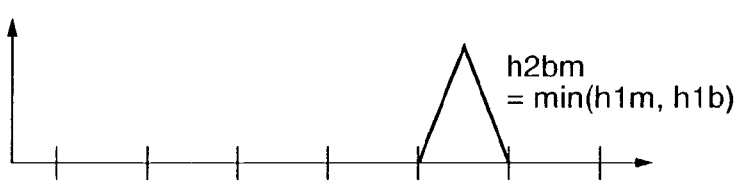
Figure 24F:
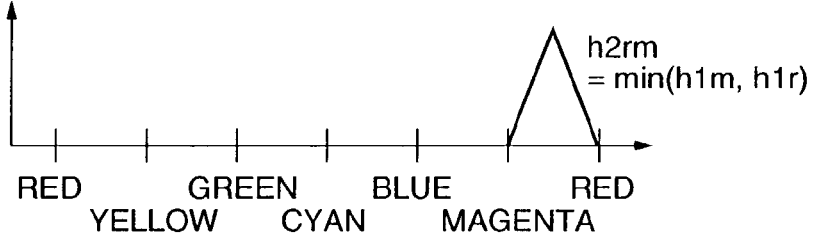

FIG. 21 is a block diagram showing an example of part of the matrix calculator 11, which calculates R3. In the drawing, reference numerals 17a to 17d denote multipliers, and 18a to 18d denote adders.

The operation of the circuit shown in FIG. 21 will next be described. The multipliers 17a to 17d receive the polynomial data T2, T4, T5 from the polynomial calculator 10, the minimum value α from the α β calculator 8 and the coefficients U(Fij) from the coefficient generator 12, and output the respective products.

The adders 18a, 18b receive the products output from the multipliers 17a to 17d, add the input data, and output the respective sums. The adder 18c adds the data from the adders 18a, 18b, and outputs their sum. The adder 18d adds the first color data R1 and the data from the adder 18c, and outputs the sum as the third color data R3.

The same configuration as that shown in FIG. 21 can be used to calculate the green component G3 and the blue component B3 of the third color data.

Incidentally, as the coefficients (Fij), those corresponding to the third color data R3, G3, B3 are used. If three configurations each identical to that shown in FIG. 21 are used in parallel for R3, G3, B3, the matrix calculation can be achieved at a high speed.

Accordingly, the equation for calculating the third color data R3, G3, B3 by means of the color converter shown in FIG. 17 is the following equation (6).

$$\begin{bmatrix} R3 \\ G3 \\ B3 \end{bmatrix} = \begin{bmatrix} R1 \\ G1 \\ B1 \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (6)$$

Here, for (Fij), i=1 to 3, j=1 to 13, $h1r=\min(m, y)$, $h1g=\min(y, c)$, $h1b=\min(c, m)$, $h1c=\min(g, b)$, $h1m=\min(b, r)$, $$h1y=\min(r, g),$$

$$h2ry=\min(aq1 \times h1y, ap1 \times h1r),$$

$$h2rm=\min(aq2 \times h1m, ap2 \times h1r),$$

$$h2gy=\min(aq3 \times h1y, ap3 \times h1g),$$

$$h2gc=\min(aq4 \times h1c, ap4 \times h1g),$$

$$h2bm=\min(aq5 \times h1m, ap5 \times h1b),$$

$$h2bc=\min(aq6 \times h1c, ap6 \times h1b)$$

where aq1 to aq6, and ap1 to ap6 are calculation coefficients generated by the calculation coefficient generator 16 shown in FIG. 18.

The difference in the number of arithmetic terms between the equation (5) and the equation (6) is due to the fact that the equation (5) represents the method of calculation for each pixel, excluding the arithmetic terms having a value zero, while the equation (6) represents a general formula for the entire set of pixels.

That is, the number of polynomial data (the first arithmetic terms, and the second arithmetic terms) can be reduced from "thirteen" in the equation (6) to "four," and this reduction is achieved by utilizing the nature of the hue data.

The combination of the effective data is altered depending on the image data of the pixel in question, and for the entire image data containing all the colors, all polynomial data will be effective.

FIG. 22A to FIG. 22F schematically illustrate the relationship between the six hues and the hue data y, m, c, r, g, b. Each hue data relates to three hues.

The equation (6) contains six first arithmetic terms each of which is effective for just one hue. The first arithmetic terms are:

$$h1r=\min(y, m),$$

$$h1y=\min(r, g),$$

$$h1g=\min(c, y),$$

$$h1c=\min(g, b),$$

$$h1b=\min(m, c),$$

$$h1m=\min(b, r).$$

FIG. 23A to FIG. 23F schematically illustrate the relationship between the six hues and the first arithmetic terms h1r, h1y, h1g, h1c, h1b, h1m. Each of the first arithmetic terms relates to just one specific hue. For instance, assuming that W is a constant, for red, r=W, and g=b=0, so that y=m=W, c=0.

Accordingly, h1r=min(y, m)=W, and other five first arithmetic terms are all zero. That is, for red, h1r=min(y, m) is the only effective first arithmetic term. Similarly, for green, h1g=min(c, y) is the only effective first arithmetic term; for blue, h1b=min(m, c) is the only effective first arithmetic term; for cyan, h1c=min(g, b) is the only effective first arithmetic term; for magenta, h1m=min(b, r) is the only effective first arithmetic term; and for yellow, h1y=min(r, g) is the only effective first arithmetic term. This also means that h1r=min(y, m) is effective just for red, and h1g=min(c, y), h1b=min(m, c), h1c=min(g, b), h1m=min(b, r), and h1y=min(r, g) are respectively effective just for green, blue, cyan, magenta, and yellow.

FIG. 24A to FIG. 24F schematically illustrate the relationship between the six hues and the second arithmetic terms h2ry=min(h1y, h1r), h2gy=min(h1y, h1g), h2gc=min (h1c, h1g), h2bc=min(h1c, h1b), h2bm=min (h1m, h1b), h2rm=min (h1m, h1r), with the calculation coefficients aq1 to aq6 and ap1 to ap6 inh2ry=min(aq1×h1y, ap1×h1r), h2gy=min(aq3×h1y, ap3×h1g) h2gc=min(aq4×h1c, ap4×h1g), h2bc=min(aq6×h1c, ap6×h1b), h2bm=min(aq5×h1m, ap5×h1b), h2rm=min(aq2×h1m, ap2×h1r) in the equation (6) being assumed to be "1."

It is seen from each of FIG. 24A to FIG. 24F, that each of the second arithmetic terms relates to change in an intermediate region in an inter-hue zone between adjacent ones of the six hues red, yellow, green, cyan, blue, and magenta, i.e., in an intermediate region in one of the six inter-hue zones red-yellow, yellow-green, green-cyan, cyan-blue, blue-magenta, and magenta-red. That is, for red-yellow, b=c=0, so that five terms other than h2ry=min(h1y, h1r)=min(min(r, g), min(y, m)) are all zero.

Accordingly, h2ry is only the effective second arithmetic term. Similarly, for yellow-green, h2gy is the only effective second arithmetic term; for green-cyan, h2gc is the only effective second arithmetic term; for cyan-blue, h2bc is the only effective second arithmetic term; for blue-magenta, h2bm is the only effective second arithmetic term; and for magenta-red, h2rm is the only effective second arithmetic term. This also means that h2ry is effective just for red-yellow, and h2gy, h2gc, h2bc, h2bm, and h2rm are respectively effective for yellow-green, green-cyan, cyan-blue, blue-magenta, and magenta-red.

FIG. 25A to FIG. 25F schematically illustrate the relationship between the six hues and the second arithmetic terms, with the calculation coefficients aq1 to aq6, and ap1 to ap6 in the hry, hrm, hgy, hgc, hbm, and hbc in the equation (6) being varied. The broken lines a1 to a6 in the drawing show the characteristics for the cases where aq1 to aq6 are greater than ap1 to ap6, while the broken lines b1 to b6 shows the characteristics for the cases where ap1 to ap6 are greater than aq1 to aq6.

Figure 25A:
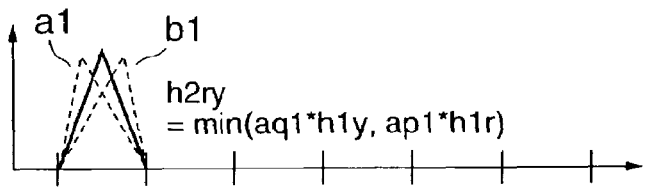
FIG. 25A to FIG. 25F schematically illustrate the relationship between the second arithmetic terms and the hues in image processing device according to Embodiment 4 of the present invention, with the calculation coefficients being changed by the calculation coefficient generator 16 in the polynomial calculator 10.
Figure 25B:
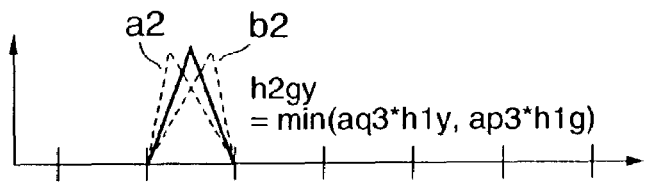
Figure 25C:
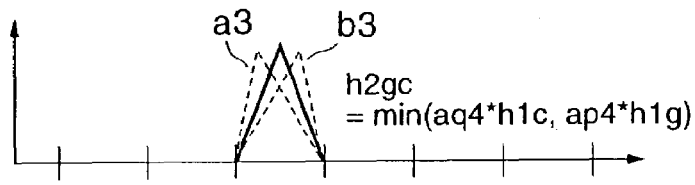
Figure 25D:
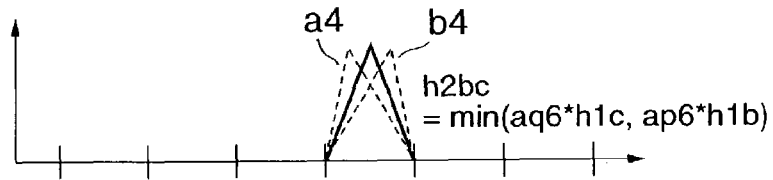
Figure 25E:
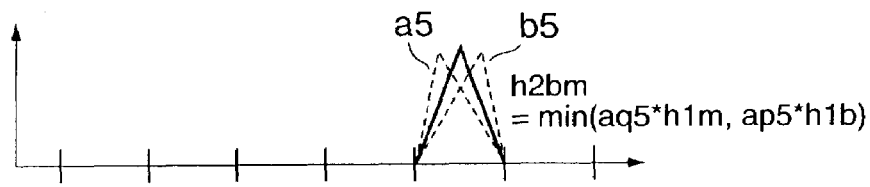
Figure 25F:
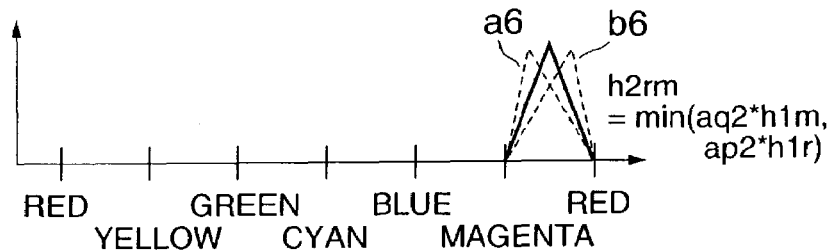

For example, for red-yellow, h2ry=min(aq1*h1y, ap1*h1r) is the only effective second arithmetic term as mentioned above, and if the ratio between aq1 and ap1 is 2:1, the resultant arithmetic term has its peak value closer to red, as shown by the broken lines a1 in FIG. 25A, and is therefore effective for a region closer to red, within the inter-hue zone red-yellow. If, on the other hand, the ratio between aq1 and ap1 is 1:2, the arithmetic term has its peak value closer to yellow as shown by the broken lines b1 in FIG. 25A, and is therefore effective for a region closer to yellow, within the inter-hue zone red-yellow. Similarly, the region for which the arithmetic term is effective within each inter-hue zone can be shifted by varying aq3, ap3 in h2gy for yellow-green, aq4, ap4 in h2gc for green-cyan;

aq6, ap6 in h2bc for cyan-blue;

aq5, ap5 in h2bm for blue-magenta; and aq2, ap2 in h2rm for magenta-red.

Figures 26A, 26B, 27:
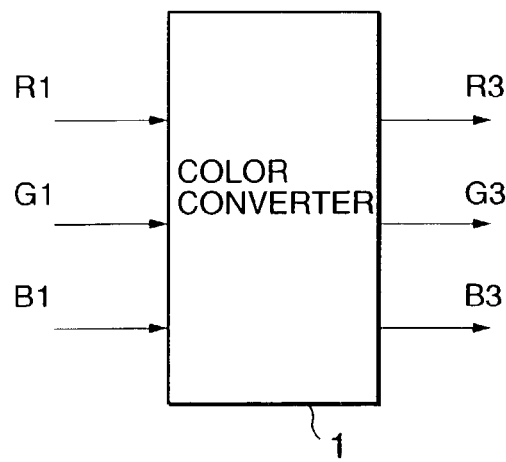
FIG. 26A and FIG. 26B show the relationship between each of the hues and regions between hues, and the arithmetic term which is effective for the particular hue or region between hues, in the image processing device according to Embodiment 4 of the present invention.
FIG. 27 is a block diagram showing an example of configuration of a conventional image processing device.
Figures 28, 29:
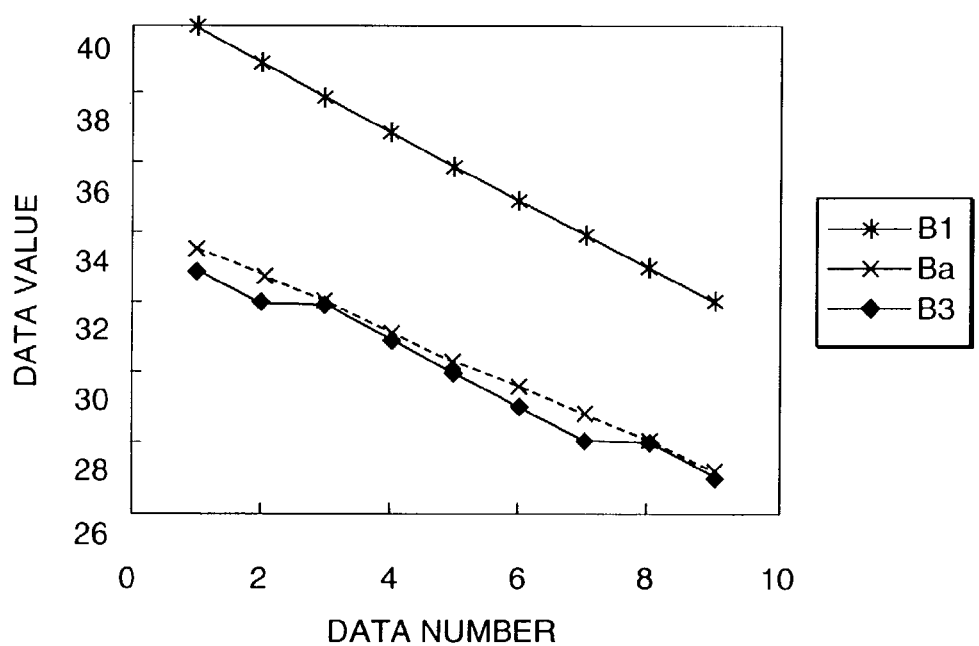
FIG. 28 shows the relationship between the first color data R1, G1, B1 and the calculated third color data R3, G3, B3 in the conventional image processing device.
FIG. 29 shows the relationship between the data numbers, the blue component B1 of the first color data, the value Ba of the ideal second color data, and the blue component B2 of the second color data in the conventional image processing device.

FIG. 26A and FIG. 26B show the relationship between the six hues and inter-hue zones, and effective arithmetic terms. By varying the coefficients for the arithmetic terms effective for the hue or a region in the inter-hue zone which it is desired to adjust by means of the coefficient generator 12, only the hue in question can be adjusted, and the degree in the change in the inter-hue zones can be corrected, and the degree in change in the inter-hue zone can be adjusted. Moreover, by varying the coefficients at the calculation coefficient generator 16 in the polynomial calculator 10, it is possible to vary the region within the inter-hue zone, at which the arithmetic term is effective without affecting other hues.

As has been described, when the color converter of this embodiment is used, it is possible to independently correct the six hues of red, green, blue, yellow, magenta, cyan, and the degree in change in the six inter-hue zones, by varying the coefficients for the first arithmetic term relating to a specific hue, or for the second arithmetic term relating to a specific inter-hue zone. Accordingly, the conversion characteristics can be varied flexibly.

The above described Embodiment 4 has been described for the case where processing is implemented by hardware. But similar functions and effects are obtained by means of software.

What is claimed is:

1. An image processing device receiving first image data including a plurality of color data and constituting image information for each pixel, and calculating and outputting second image data comprising a plurality of color data, comprising:
   a color converter for performing color conversion on the first image data; and
   a dither processor for applying dither processing to the image data obtained by the color conversion at the color converter, to obtain the second image data,
   wherein the dither processor includes:
      a dither coefficient generator for generating dither coefficients corresponding to the positions of the respective pixels of the first image data; and
      a dither coefficient adder for adding said dither coefficients to the image data obtained by the color converter.

2. The image processing device as set forth in claim 1, wherein said dither coefficient generator varies the dither coefficients for every frame of the image.

3. The image processing device as set forth in claim 1, further comprising:
   a tone converter for performing tone conversion on the image data obtained by the color conversion at the color converter, wherein
   said dither processor applies the dither processing to the image data obtained by the tone conversion at the tone converter.

4. The image processing device as set forth in claim 3, wherein said dither processor comprises:
   a dither coefficient generator for generating dither coefficients corresponding to positions of the respective pixels of the first image data; and
   a dither coefficient adder for adding said dither coefficients to the image data obtained by the tone conversion.

5. The image processing device as set forth in claim 4, wherein said dither coefficient generator varies the dither coefficients for every frame of the image.

6. The image processing device as set forth in claim 1, wherein said color converter comprises:
   a coefficient generator for generating predetermined matrix coefficients;
   an arithmetic term calculator for calculating a plurality of arithmetic terms, each of which is effective for only a specific hue among a plurality of hues; and
   a matrix calculator for performing matrix calculation using the matrix coefficients and said plurality of arithmetic terms to produce color-converted image data.

7. The image processing device as set forth in claim 6, wherein said plurality of hues include six hues of red, green, blue, cyan, magenta, and yellow.

8. The image processing device as set forth in claim 1, wherein said color converter comprises:
   a coefficient generator for generating predetermined matrix coefficients;
   an arithmetic term calculator for calculating a plurality of arithmetic terms, each of which is effective for only a region between specific hues among a plurality of hues; and
   a matrix calculator for performing matrix calculation using the matrix coefficients and said plurality of arithmetic terms to produce color-converted image data.

9. The image processing device as set forth in claim 8, wherein said plurality of hues include six hues of red, green, blue, cyan, magenta, and yellow.

10. An image processing method receiving first image data consisting of a plurality of color data and constituting image information for each pixel, and calculating and outputting second image data comprising a plurality of color data, comprising:
    a color conversion step of performing color conversion on the first image data; and
    a dither processing step of applying dither processing to the image data obtained by the color conversion at the color conversion step, to obtain the second image data,
    wherein the dither processing step includes,
    a dither coefficient generating step of generating dither coefficients corresponding to the
    positions of the respective pixels of the first image data; and
    a dither coefficient adding step of adding said dither coefficients to the image data
    obtained by the color conversion.

11. The image processing method as set forth in claim 10, further comprising the step of varying the dither coefficients for every frame of the image.

12. The image processing method asset forth in claim 10, further comprising:
    a tone converting step of performing tone conversion on the image data obtained by the color conversion at the color conversion step, wherein
       said dither processing step applies the dither processing to the image data obtained by the tone conversion at the tone converting step.

13. The image processing method asset forth in claim 12, wherein said dither processing step comprises:
    a dither coefficient generating step of generating dither coefficients corresponding to positions of the respective pixels of the first image data; and
    a dither coefficient adding step of adding said dither coefficients to the image data obtained by the tone conversion.

14. The image processing method asset forth in claim 13, further comprising the step of varying the dither coefficients for every frame of the image.

15. The image processing method asset forth in claim 10, wherein said color conversion step comprises:
    a coefficient generating step of generating predetermined matrix coefficients;
    an arithmetic term calculating step of calculating a plurality of arithmetic terms, each of which is effective for only a specific hue among a plurality of hues; and
    a matrix calculation step of performing a matrix calculation using the matrix coefficients and the plurality of arithmetic terms each of which is effective for only a specific hue to produce color-converted image data.

16. The image processing method as set forth in claim 15, wherein said plurality of hues include six hues of red, green, blue, cyan, magenta, and yellow.

17. The image processing method asset forth in claim 10, wherein said color conversion step comprises:
- a coefficient generating step of generating predetermined matrix coefficients;
- an arithmetic term calculating step of calculating a plurality of arithmetic terms which is effective for only a region between specific hues among a plurality of hues; and
- a matrix calculation step of performing matrix calculation using the matrix coefficients and the plurality of arithmetic terms each of which is effective for only the region between said specific hues to produce color-converted image data.

18. The image processing method as set forth in claim 17, wherein said plurality of hues include six hues of red, green, blue, cyan, magenta, and yellow.

* * * * *